United States Patent
Browning, Jr. et al.

(10) Patent No.: US 7,852,213 B2
(45) Date of Patent: Dec. 14, 2010

(54) DOUBLE-END FIBER OPTIC SECURITY SYSTEM FOR SENSING INTRUSIONS

(75) Inventors: Thomas E. Browning, Jr., Spartanburg, SC (US); Randall E. Wooten, Woodruff, SC (US); Mark C. Phillips, Woodruff, SC (US); Mary H. Owens, Simpsonville, SC (US); Sam S. Shasteen, Greenville, SC (US)

(73) Assignee: Woven Electronics, LLC, Mauldin, SC (US)

( * ) Notice: Subject to any disclaimer, the term of this patent is extended or adjusted under 35 U.S.C. 154(b) by 704 days.

(21) Appl. No.: 11/890,450

(22) Filed: Aug. 6, 2007

(65) Prior Publication Data

US 2009/0040046 A1 Feb. 12, 2009

(51) Int. Cl.
*G08B 13/18* (2006.01)
(52) U.S. Cl. .................. 340/555; 340/541; 340/545.6; 340/557; 340/600; 250/227.14; 250/227.16; 385/12; 385/13
(58) Field of Classification Search ......... 340/555–557, 340/541, 545.6, 545.9, 564, 600; 250/227.14–227.16; 385/12, 13, 100
See application file for complete search history.

(56) References Cited

U.S. PATENT DOCUMENTS

| | | | |
|---|---|---|---|
| 4,217,488 A | 8/1980 | Hubbard | |
| 4,369,437 A | 1/1983 | Thompson, Jr. et al. | |
| 4,379,289 A * | 4/1983 | Peek | 340/555 |
| 4,447,123 A | 5/1984 | Page et al. | |
| 4,577,184 A * | 3/1986 | Hodara et al. | 340/566 |
| 4,777,476 A | 10/1988 | Dank | |
| 4,814,562 A | 3/1989 | Langston | |
| 4,829,286 A | 5/1989 | Zvi | |
| 5,049,855 A | 9/1991 | Slemon et al. | |
| 5,055,827 A | 10/1991 | Philipp | |
| 5,144,125 A * | 9/1992 | Carter et al. | 250/227.15 |
| 5,434,557 A | 7/1995 | Alizi | |
| 5,592,149 A | 1/1997 | Alizi | |
| 5,594,239 A | 1/1997 | Lessing | |
| 5,790,285 A | 8/1998 | Mock | |
| 6,002,501 A | 12/1999 | Smith et al. | |

(Continued)

FOREIGN PATENT DOCUMENTS

GB 2098770 A 11/1982

*Primary Examiner*—George A Bugg
*Assistant Examiner*—Anne V Lai
(74) *Attorney, Agent, or Firm*—McNair Law Firm; Cort Flint

(57) ABSTRACT

A security system is disclosed for detecting intrusions at a plurality of predetermined locations having moveable closure members. The system comprises a plurality of intrusion sensors disposed at the locations for detecting movement of the closure members. Primary and secondary optical fiber sensor lines are routed through the intrusion sensors, and primary and secondary scanning units pulse signals along the sensor lines and receive reflected signals back from the sensor lines. A processor processes the reflected signals to determine if a reflection and/or attenuation change has occurred in a reflected pulse signal signifying a prescribed level of unauthorized intrusion activity which matches a signature intrusion signal. In the event of a cut through in the sensor lines, the primary sensor line monitors the sensors downstream of the break, and the secondary sensor line is activated to monitor the sensors upstream of the break.

29 Claims, 17 Drawing Sheets

U.S. PATENT DOCUMENTS

| | | | |
|---|---|---|---|
| 6,091,868 A * | 7/2000 | Tartarilla et al. | 385/19 |
| 6,101,025 A * | 8/2000 | Naganuma | 359/341.33 |
| 6,236,789 B1 | 5/2001 | Fitz | |
| 6,594,004 B1 * | 7/2003 | Makita | 356/73.1 |
| 6,927,690 B2 * | 8/2005 | Wilson | 340/545.3 |
| 6,967,584 B2 * | 11/2005 | Maki | 340/657 |
| 6,980,108 B1 * | 12/2005 | Gebbia et al. | 340/555 |
| 7,109,873 B2 * | 9/2006 | Giotto et al. | 340/590 |
| 7,385,506 B2 * | 6/2008 | Shibata et al. | 340/557 |
| 7,622,706 B2 * | 11/2009 | Maas | 250/227.14 |
| 7,782,196 B2 * | 8/2010 | Piper et al. | 340/541 |
| 2004/2330954 | 11/2004 | Neff et al. | |

* cited by examiner

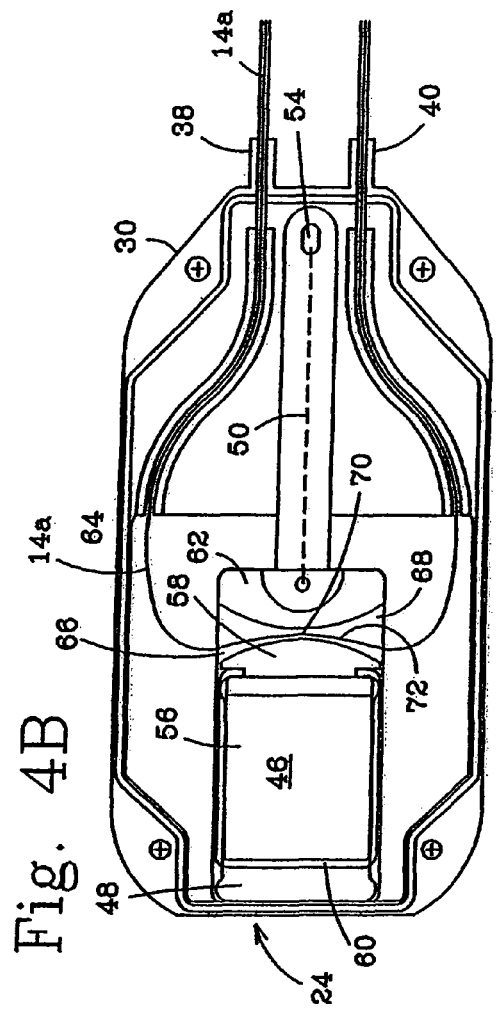
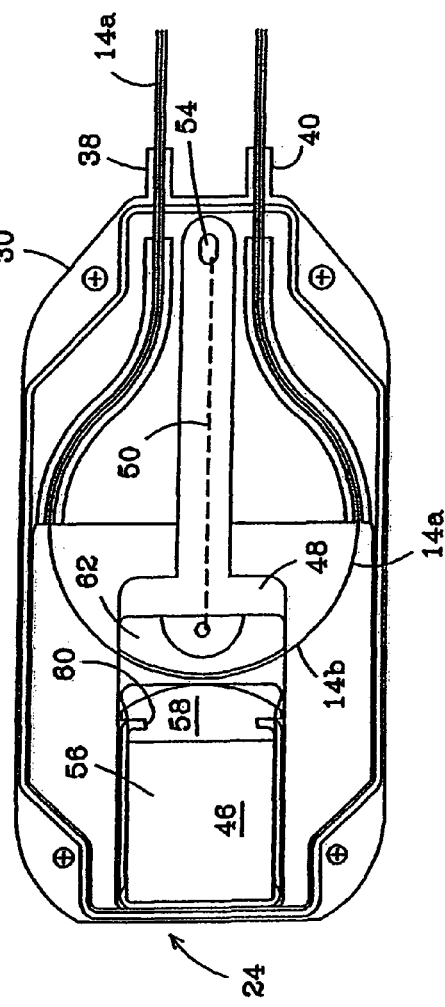
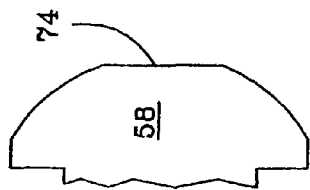

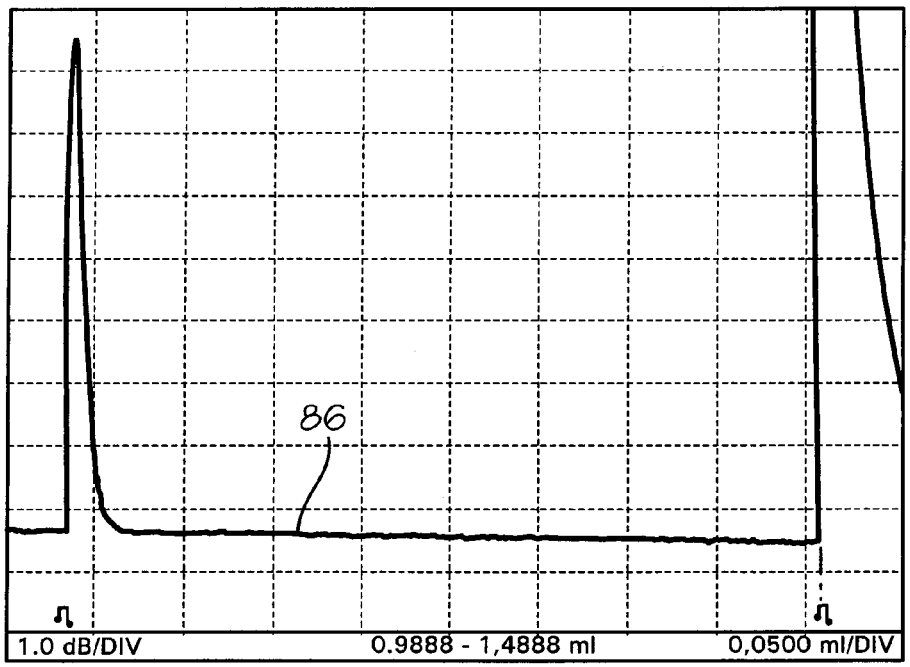
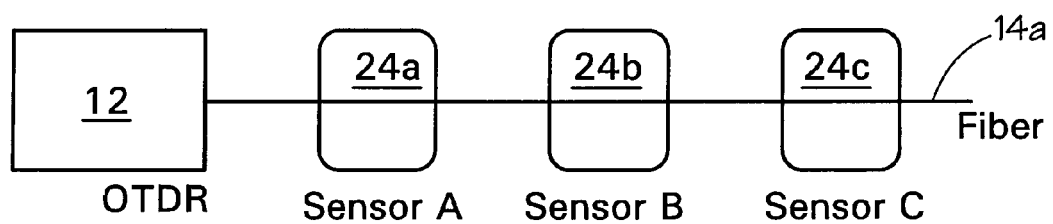
Fig. 5

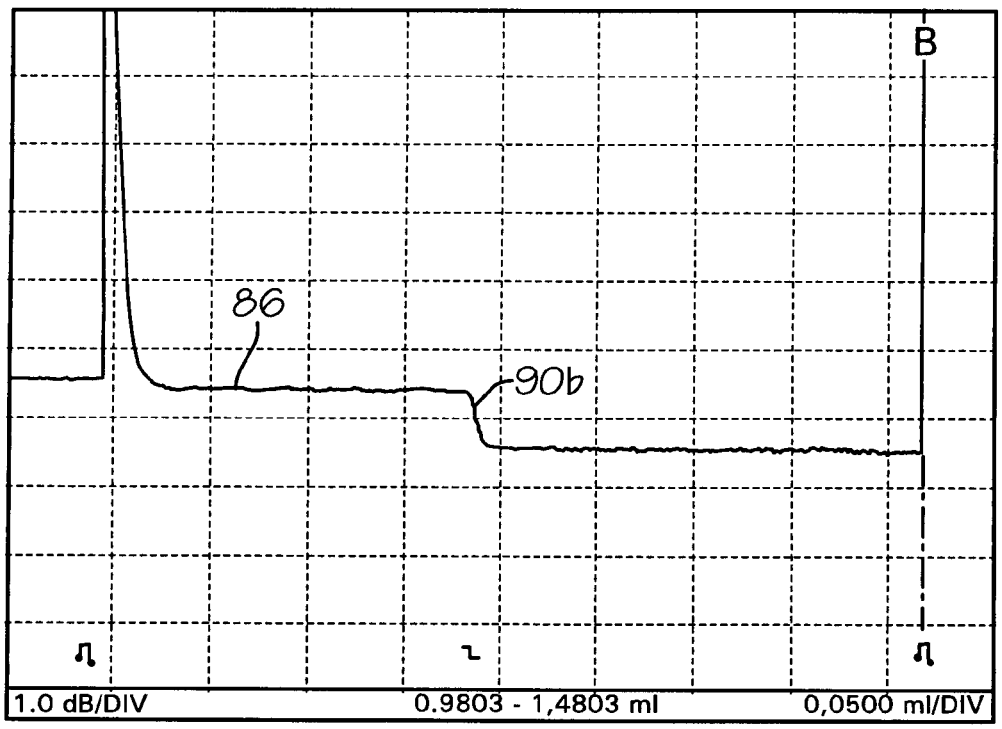
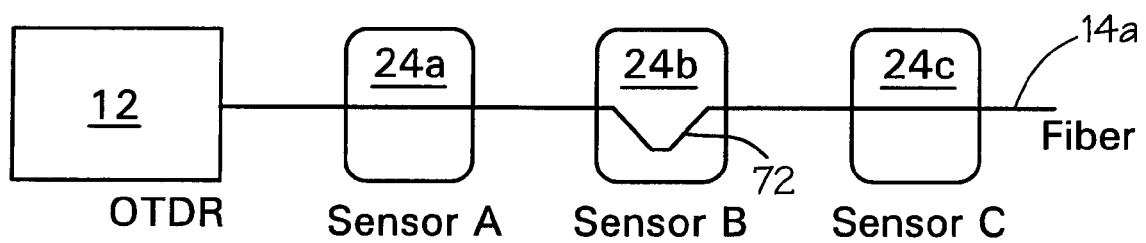
Fig. 6

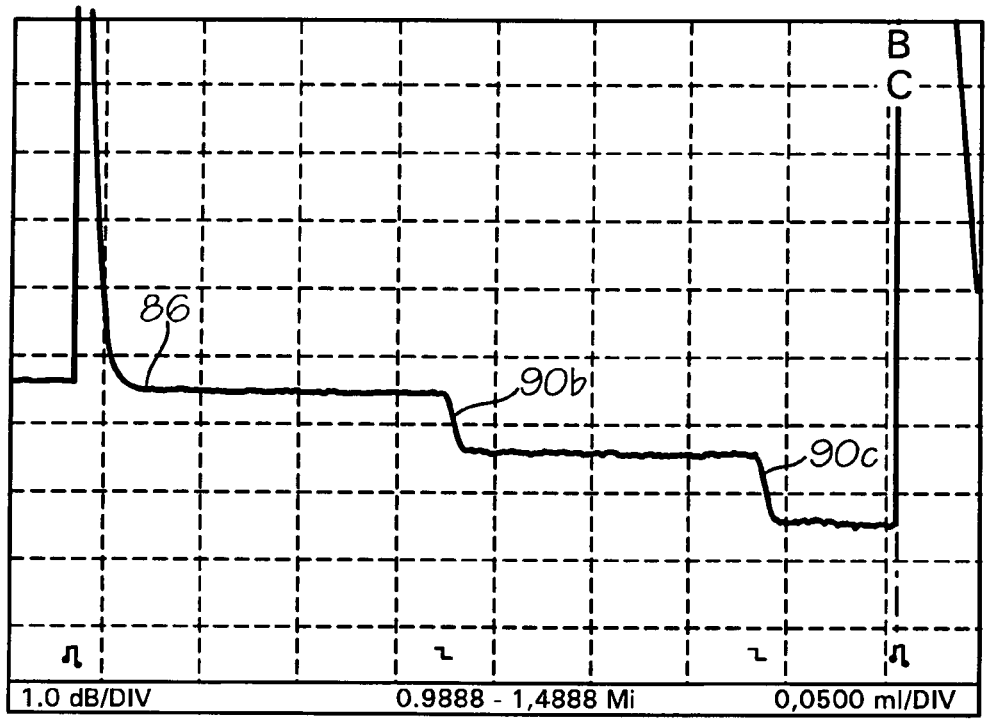
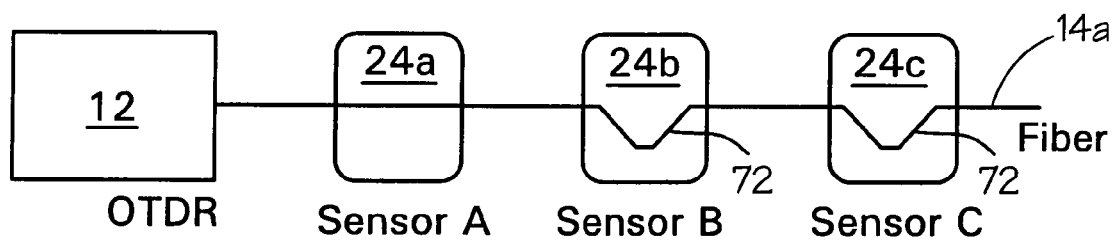
Fig. 7

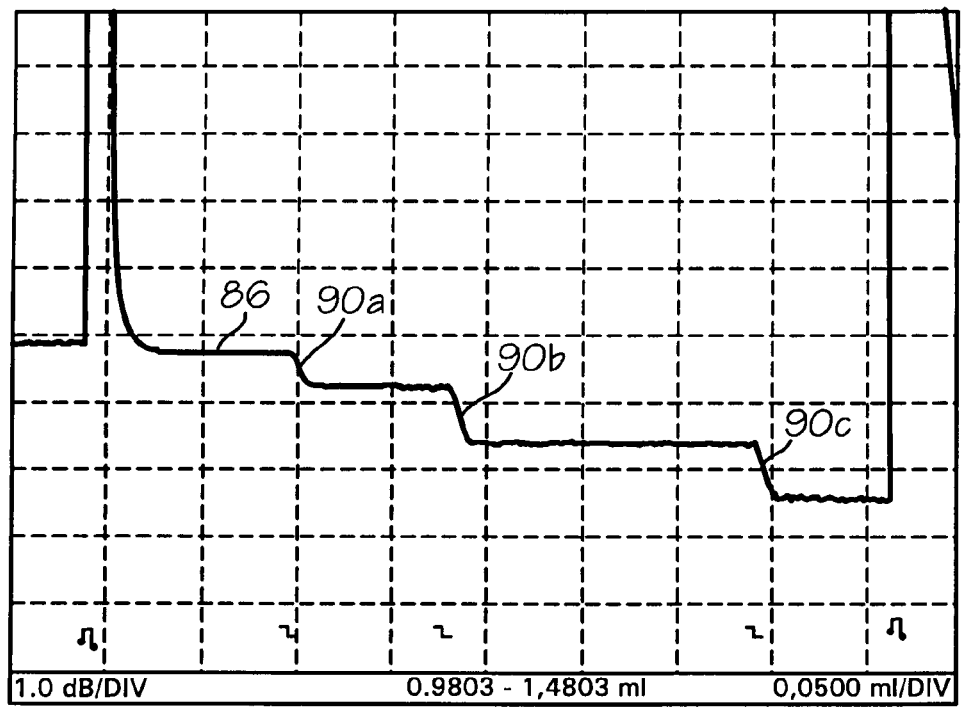
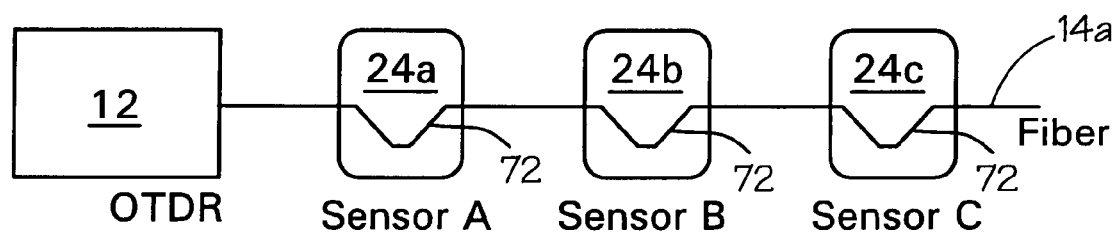
Fig. 8

DOUBLE-END FIBER OPTIC SECURITY SYSTEM FOR SENSING INTRUSIONS

This application is related to and claims priority from U.S. Provisional Application No. 60/456,687, filed Mar. 15, 2003, entitled "Fiber Optic Security System For Sensing the Intrusion Of Secured Locations," now abandoned; U.S. non-provisional application Ser. No. 10/429,602, filed May 5, 2003, entitled "Fiber Optic Security System For Sensing Intrusion Of Secured Locations;" PCT application no. PCT/US2004/013494, filed May 3, 2004, entitled "Fiber Optic Security System For Sensing The Intrusion Of Secured Locations;" now International Publication Number WO 2004/100095 A2, published Nov. 18, 2004; U.S. non-provisional application Ser. No. 10/555,534, filed May 10, 2006, entitled "Fiber Optic Security System For Sensing The Intrusion Of Secured Locations;" U.S. Provisional Application No. 60/626,197, filed Nov. 9, 2004, entitled "Vehicle Denial Security System;" U.S. non-provisional application Ser. No. 11/083,038, filed Mar. 17, 2005, entitled "Apparatus And Method For A Computerized Fiber Optic Security System;" now International Publication number WO 2006/05277 A2, published May 18, 2006; U.S. Provisional Application No. 60/673,699, filed Apr. 21, 2005, entitled "Secure Above Ground Fiber Optic Data Transmission Cable;" PCT application no. PCT/US2005/040079, filed Nov. 4, 2005, entitled "Vehicle Denial Security System," now International Publication Number WO 2006/052776 A2, published May 18, 2006; PCT application no. PCT/US2005/040080, filed Nov. 5, 2005, entitled "Apparatus And Method For A Computerized Fiber Optic Security System," now International Publication Number WO 2006/05277 A2, published May 18, 2006; and PCT application no. PCT/US2006/014601, filed Apr. 19, 2006, entitled "Secure Transmission Cable," now International Publication Number WO 2006/115913 A2, published Nov. 2, 2006, all of which are incorporated by reference into this application.

BACKGROUND OF THE INVENTION

This invention relates to a fiber optic security system and sensor for detecting the intrusion of a secured location and, more particularly, to such a system and sensor wherein each secured location includes a moveable closure member which secures the location and a fiber optic sensor lines routed through the sensors wherein the sensors sense movement of the closure members to an unsecured position, and the system detects the occurrence, type, and location of the intrusion.

With the increase in terrorist events needed to be prevented in the United States, the need for effective security systems to sense intrusion into secured areas has greatly increased. In particular, a security system for the protection of a vast system of underground utilities accessed by manholes with removable covers is needed. A highly effective system to detect entrance into these underground spaces and utilities is needed in order to protect against vandalization and terrorist activities within these spaces and the spaces to which these underground utilities lead. Heretofore, it has been known to use fiber optic sensors to detect theft of articles, intrusion into protected areas, as well as a variety of other purposes.

For example, U.S. Pat. No. 4,369,437 discloses a security and alarm apparatus to detect movement of a cover for a fill pipe leading to an underground fuel tank wherein an alarm signal is transmitted if the cover is disturbed. However, the system does not use fiber optics, requires electrical power at the location, and is generally not suited for a wide area security system.

U.S. Pat. No. 5,055,827 discloses an fiber optic security system to prevent the theft of appliances located in a network of computers, terminals, and associated peripheral devices. When one of the appliances is moved, light attenuation of a fiber cable results in a signal being generated. However, this system requires physical connection of the optic fiber to the appliance and the system is not suitable for detecting events in a wide geographical area.

U.S. Pat. No. 5,434,557 discloses an intrusion detection system having at least one optical cable which is usually part of a fence. When the intruder exerts force on the fence, the movement actuates a mechanical device exerting force on the cable which is detected and actuates an alarm. Here again, the system requires physical connection to the moveable part of the fence and the fiber optic cable requires electrical power at the location, and is generally not suitable for wide geographical areas.

U.S. Pat. No. 5,594,239 discloses a measuring system for monitoring buildings, train sections, or the like, consisting of a beam wave guide bending sensor. Basically, the system utilizes the deflection of a beam wave length to detect movement of the building structure.

U.S. Pat. No. 4,814,562 discloses a pressure sensor which utilizes pressure on a fiber optic in order to measure pressure.

U.S. Pat. No. 5,592,149 discloses a security fence which utilized an optical wire woven into the fence material whereupon movement of the fencing by an intruder causes the fiber wire to move and actuate an alarm signal. Once again physical connection is required between the optic fiber and the moveable closure member. U.S. Pat. No. 4,777,476 discloses another security fence wherein the optic fiber is physically connected to the moveable member to detect movement of a moveable member and intrusion to generate an alarm. U.S. Pat. No. 4,829,286 discloses yet another security fence requiring physical connection of the optic fiber to a moveable member in order to generate a signal caused by an intruder moving the fiber optic. U.S. Pat. No. 5,049,855 discloses a security screen system wherein an optical fiber is woven into the screen mesh and distortion of the screen material by an intruder causes an alarm signal.

Not only do the above security systems and sensors require a physical connection between the optic fiber and the moveable member, but the systems require electrical power at the location sought to be protected making them wholly unsuitable for many security applications, including wide geographical area systems. More importantly, no provision is made for identifying the location of an intrusion event where large numbers of sensors are utilized.

Accordingly, an object of the present invention is to provide a security system for detecting intrusion at a secured location using a fiber optic network and sensor by which the occurrence and location of an intrusion even can be reliably determined.

Another object of the invention is to provide a sensor for a securing system which generates a reliable signal for detection by an optical time domain reflectometer (OTDR) device no matter how briefly the sensor is activated.

Another object of the present invention is to provide a security system for detecting an intrusion at any one of a plurality of secured locations by an intruder using optic fiber sensor lines wherein the actuation of a sensor and determining the exact location of the sensor and the intrusion can be determined at any one of the locations.

Another object of the present invention is to provide a double-end optic fiber security system having primary and secondary units and sensor lines wherein two sensor lines run through each sensor, and in the event of a completer line break, the primary unit monitors closure members downstream of the break and the secondary unit monitors closure members on the upside of the break so that reliability is ensure in all situations.

Another object of the present invention is to provide a sensor for a security system which can be utilized with an fiber optic network requiring no electrical power and requiring no physical connection to a moveable closure member having a secured position in order to detect movement of the moveable member to an unsecured position.

Yet another object of the invention is to provide a security system using a pre-existing fiber optic network which carries voice and/or data transmissions wherein a fiber of the network may be connected to a series of sensors and to an optical reflectometer so that the occurrence and location of an intrusion may be determined.

SUMMARY OF THE INVENTION

The above objectives are accomplished according to the present invention by providing a security system for detecting intrusion at a plurality of predetermined locations using a plurality of optic fibers as sensor lines. The system comprises sensors disposed at the locations contacting at least one optic fiber sensor line for detecting and assessing physical intrusions at the locations and generating intrusion signals when one or more sensors are activated signifying a prescribed attenuation level or reflection exists. A processor in communication with the sensor fiber receives the attenuated intrusion signals from the activated sensors and determines the location of each activated sensor and cause of the signal by assessment. A communication output is operatively associated with the processor for communicating identification of each activated sensor and the location of each activated sensor and cause of intrusion. Typically, the locations include a moveable closure member which must be moved in order to intrude into the location, and the sensors are disposed adjacent to the closure members in a non-contacting manner. The sensors detect a predetermined movement of the closure members from a secured position to an unsecured position whereby intrusion signals are generated without physical connection between the sensors and the moveable members. Advantageously, the sensors may include magnetic attractions between the sensors and the moveable members whose interruption causes activation of the sensors and generation of the intrusion signals. In the illustrated embodiment, the sensors include a reciprocating sensor actuator having a deactivated position and an activated position. The sensor actuator engages the sensor fiber when the moveable members are in an unsecured position causing sensor activation and the intrusion signal to be generated. The moveable sensor actuator forms a predetermined bend in the sensor fiber when activated to produce a characteristic intrusion signal that is readily recognizable by the processor to reliably detect a sensor activation and sensor location. In an advantageous aspect, the sensor actuator includes a first contoured abutment with a prescribed contour for engaging the sensor fiber, producing a predetermined bend in the sensor fiber upon activation of the sensor. In the illustrated embodiment, the sensor includes a sensor housing having a fiber chamber. Preferably, a first and a second optical fiber sensor line are routed through the fiber chambers of the sensors. Scanning units are connected in communication with the sensor lines for transmitting periodic pulse signals along one or more of the sensor lines, and for receiving reflected pulse signals back from the ends of the sensor lines. In the event a break occurs in the sensor lines, the processor controls the scanning units to pulse the first sensor line downstream from the break and pulse the second sensor line upstream from the break. In accordance with a method for detecting intrusion into a protected location includes pulsing the sensor lines with a periodic pulse signal and receiving a reflected pulse signal back from said sensor lines. The reflected pulse signals are continually processed to determine if a predetermined change, i.e. attenuation and/or reflection, in the pulse signals has occurred signifying a bona fide intrusion signal and a predetermined type and cause unauthorized activity. Finally, a proper, predetermined response to the threat is initiated based on the signature and type of intrusion signal. Preferably, the connection between the sensor is made without a mechanical connection between the sensor and the moveable closure member. The method includes providing a sensor having a moveable actuator which contacts the fiber causing generation of the intrusion signal in response to movement of the moveable member to the unsecured position or a cut through, and the reflected pulse signal is shaped to have a minimum pulse width for reliable diction of one or more sensors activated alone, or in combination.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 4A is a top plan view of an optic intrusion sensor according to the invention with the cover removed and the sensor actuator in a deactivated position;

FIG. 4B is a top plan view of an optic intrusion sensor according to the invention with the cover removed and the sensor actuator in an activated position;

FIG. 4C is a partial view of a sensor actuator of the optic intrusion sensor illustrating a contoured surface of the actuator which produces a characteristic bend in an optic fiber used as a sensor fiber so that a characteristic signal is produced by an optical timed domain reflectometer connected to the fiber;

FIG. 5 is a schematic illustration of three of the intrusion sensors wired in a fiber optic network, and a graphic display of a normal OTDR signal produced when the sensors are not activated;

FIG. 6 is a graphic display of the OTDR signal when one sensor is activated;

FIG. 7 is a graphic display of the OTDR signal when two of the sensors are activated;

FIG. 8 is a graphic display of the OTDR signal when all three of the sensors in the optical network are activated;

DESCRIPTION OF A PREFERRED EMBODIMENT

Figure 1:
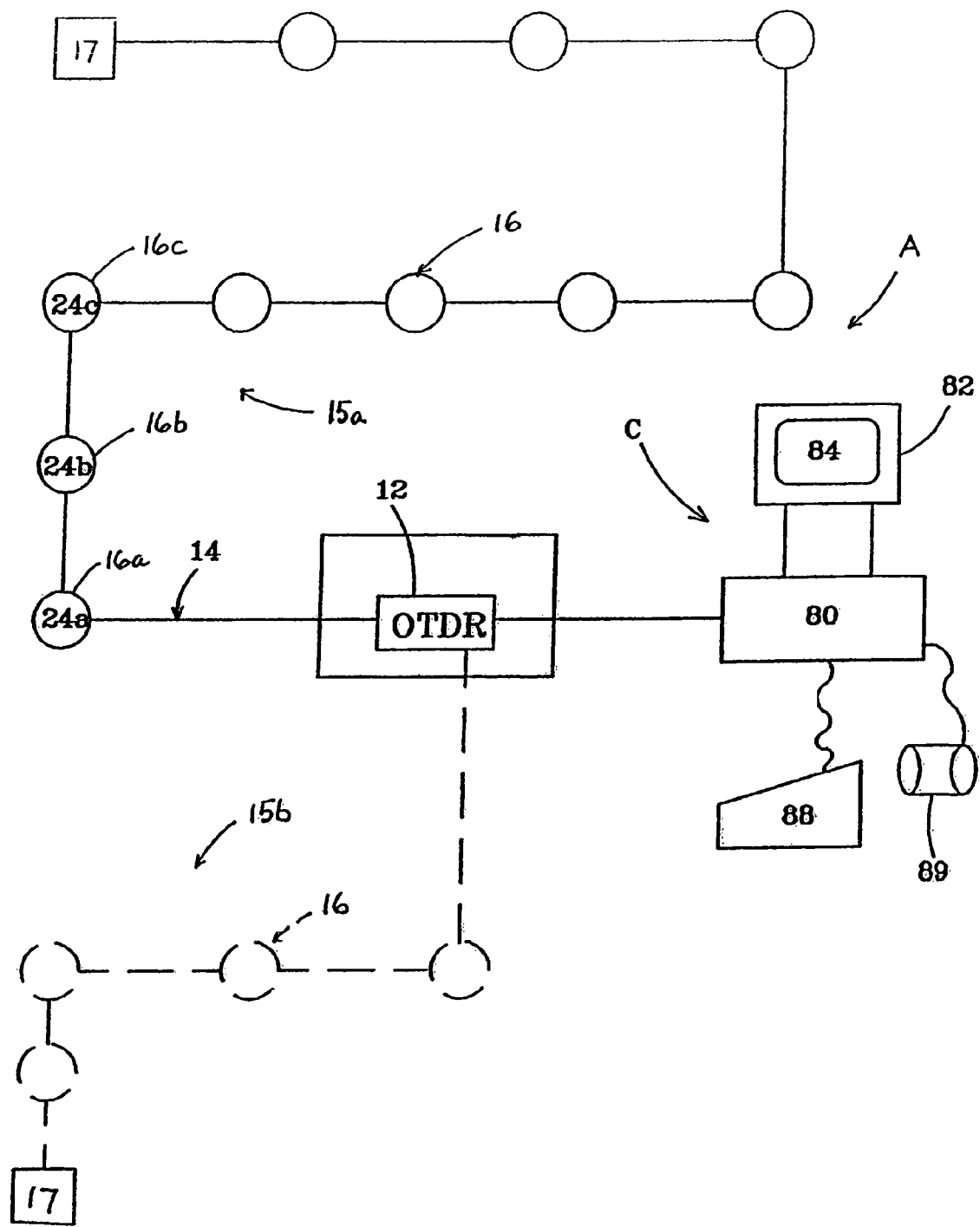
FIG. 1 is a schematic diagram illustrating one embodiment of a security system according to the invention employing fiber optic networks wherein a plurality of intrusion sensors are connected in series in the networks and wherein the networks includes an optical time domain reflectometer (OTDR)

Referring now to the drawings, the invention will now be described in more detail.

As can best be seen in FIG. 1, an optical fiber security system, designated generally as A, is illustrated. The security system includes a remote processor, designated generally as 10, for processing an intrusion signal to determine the occurrence, type or cause, and location of the intrusion. The processor may, for example, include an optical time domain reflectometer (OTDR) 12, of the type routinely utilized to monitor maintenance of fiber optic network systems, coupled with a computer and resident software for assessing the nature of the intrusion based on stored "signature" intrusion signal data. Typically, the OTDR is used to sense a fiber breakage, water seepage, irregular bends, or other defects in one or more optical fibers of the fiber network along the routing path of the network. For example, in large municipalities it is not uncommon for there to be 1,000 miles of fibers in an optical fiber network. However, as opposed to these conventional uses, an expedient of the present invention is to utilize the OTDR to detect the occurrence and exact location of an individual attempting an intrusion into a secured location, and to process the signal further to assess the cause of the intrusion. In the illustrated embodiment of FIG. 1, the OTDR is connected to two fiber optic networks 15a and 15b. Each network includes a plurality of secured locations comprised of a series of utility manholes 16. A transponder 17 may be located at the end of each fiber optic network. The manholes include manhole manifolds 18, and manifold covers 20 which cover and secure the manholes. For purposes of illustration, and not limitation, three manholes 16a, 16b, and 16c of network 15a will be discussed to illustrate the invention. Of course, any number of manholes as are disposed in close proximity to the fiber optic network may be placed in series in the security system. Typically, fiber optic networks run through the underground tunnels to which access is provided through the manholes. Of course, many other type of utility cables, channels, water and sewage are typically routed through the underground tunnels.

Figure 2:
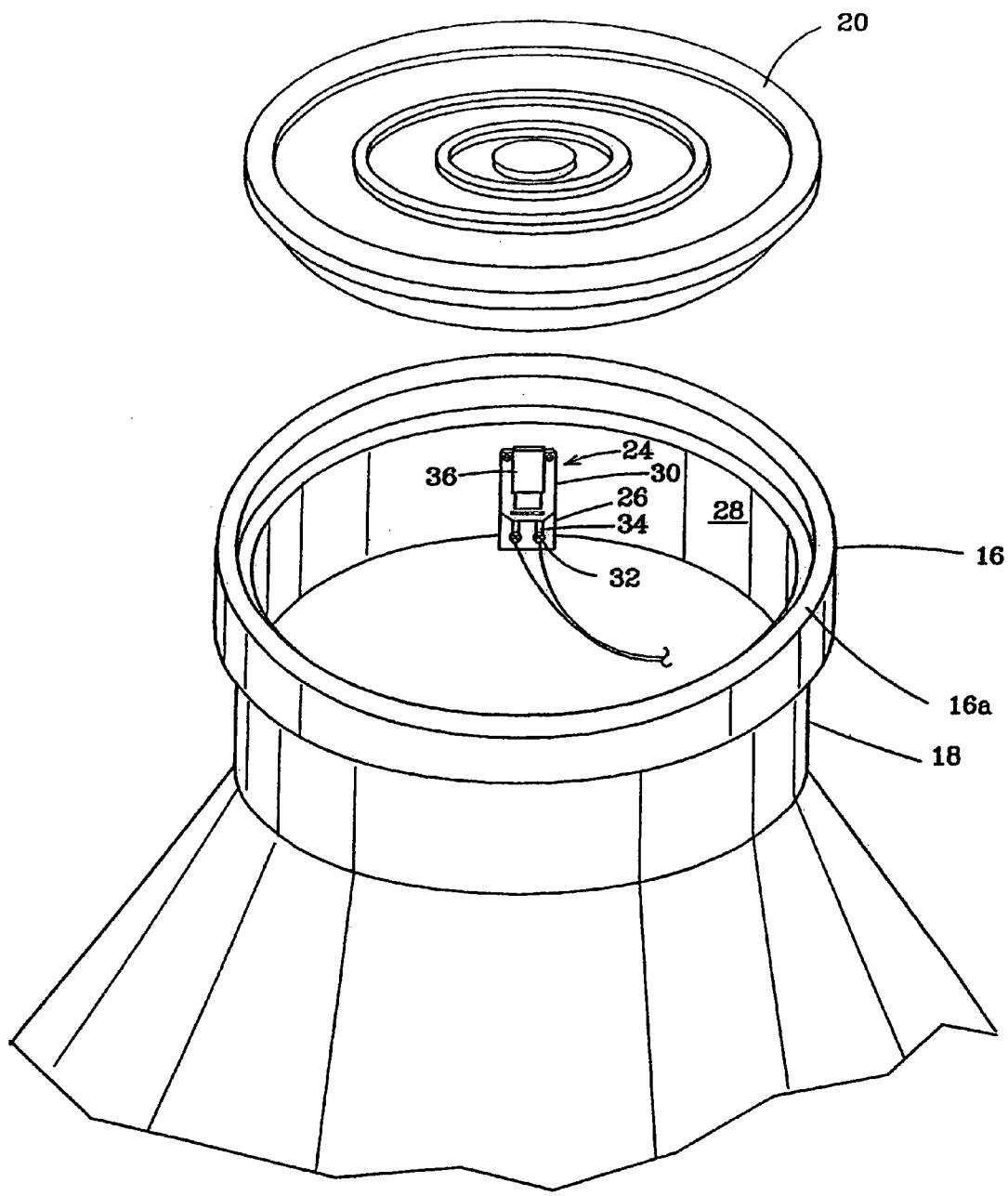
FIG. 2 is perspective view of an optic intrusion sensor according to the invention mounted to a manifold of a manhole to detect the removal of the manhole cover wherein the cover is shown in a secured position.
Figure 3A:
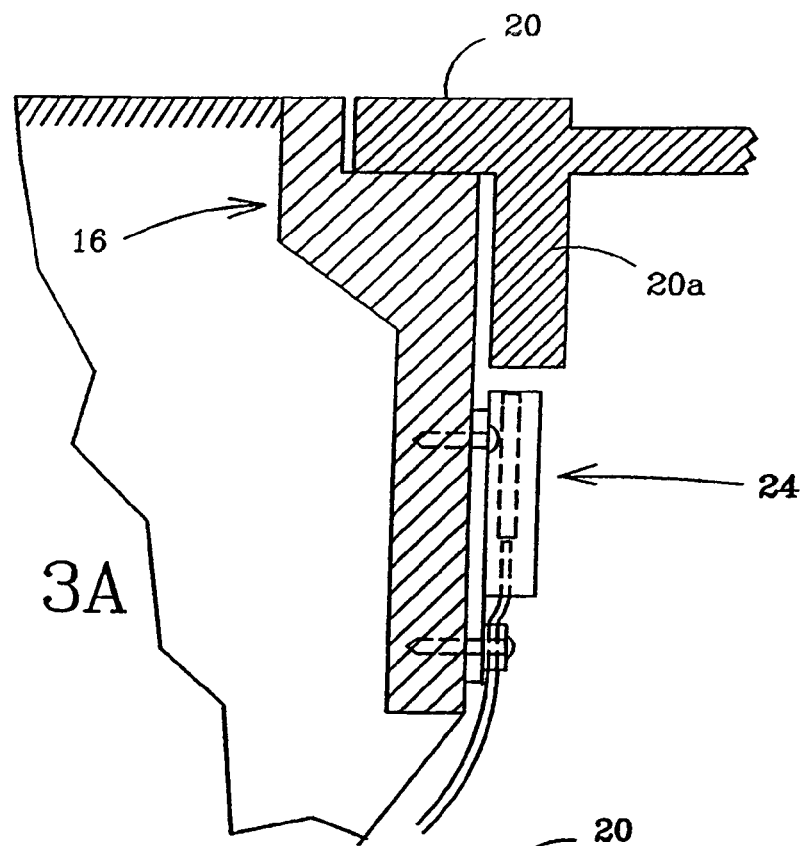
FIG. 3A is a section view of an optic intrusion sensor according to the invention mounted to a manifold of a manhole to detect the removal of the manhole cover wherein the cover is shown in a secured position which activates the sensor.
Figure 3B:
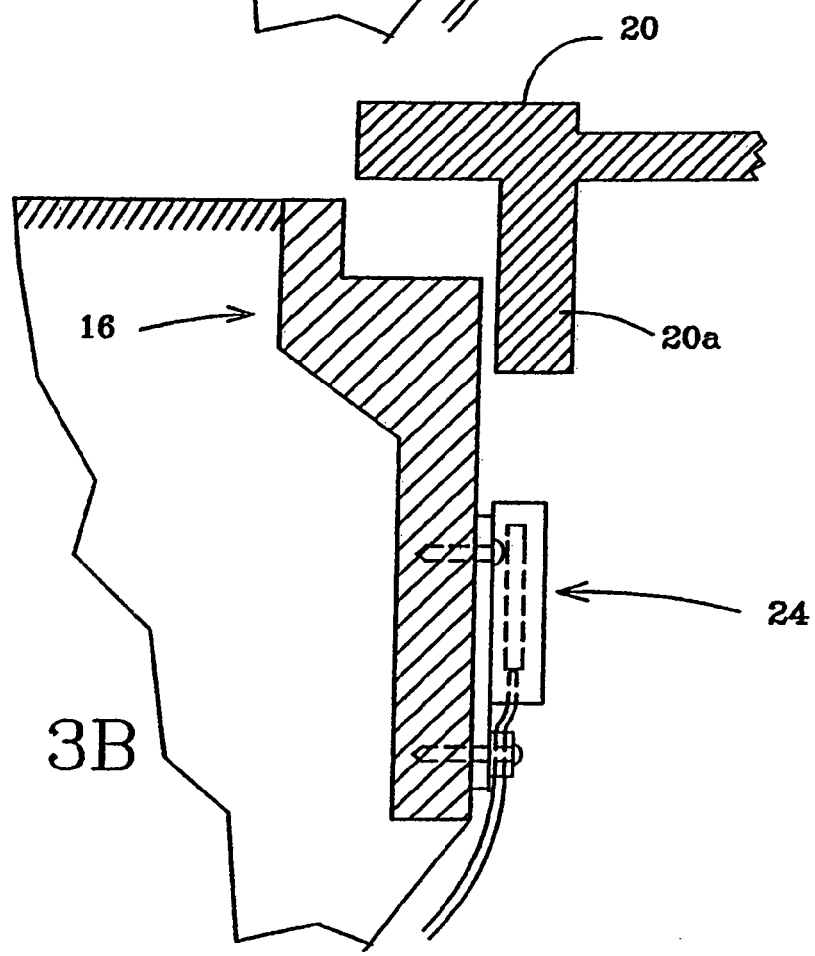
FIG. 3B is a section view of an optic intrusion sensor according to the invention mounted to a manifold of a manhole to detect the removal of the manhole cover wherein the cover is shown in an unsecured position which activates the sensor.

As can best be seen in FIGS. 2, 3A, and 3B, a sensor, designated generally as 24, is attached in a stationary position by means of an adjustable bracket 26 to an interior sidewall 28 of each manifold. Each sensor includes a sensor housing 30 attached to mounting bracket 26 which, in turn, is mounted to interior sidewall 28 by means of conventional fasteners 32 extending through adjustable slots 34 of bracket 26. In this manner, the vertical position of sensor 24 can be adjusted relative to a top flange 20a of manhole cover 20 so as to be mounted out of contact but closely adjacent to the flange of the manhole cover, for reasons explained more fully below. FIG. 3A shows the manhole cover in a secured position wherein the sensor is deactivated. FIG. 3B shows the manhole cover moved to an unsecured position wherein the sensor is activated.

As can best be seen in FIGS. 4A and 4B, intrusion sensor housing 30 includes a fiber entrance 38 and a fiber exit 40. A moveable sensor actuator 46 is slidably carried within a cut-out slide cavity 48. A spring 50 is attached to the sensor actuator at 52 on one end and to a post 54 affixed to housing 30 at an opposite end. In the illustrated embodiment, sensor actuator 46 includes a magnet 56 and a first arcuate abutment 58 made integral with magnet 56 by means of a clip 60. Sensor actuator 46 also includes a second arcuate abutment 62. Arcuate abutments 58, 62 define a fiber receiving space 64 there between. Receiving space 64 includes an entrance trumpet 66, an outlet trumpet 68, and a throat 70 there between. A fiber 14a, which is removed from the fiber network, is routed through the sensor and the fiber receiving space. Preferably the sheath of the fiber is removed so that only the optic fiber 14a is routed through the receiving space of the sensor actuator. The sensor is illustrated in a deactivated position in FIG. 4A wherein fiber 14a is routed through the housing inlet, fiber receiving space 64, and the fiber outlet. It can be seen that the fiber passing through the fiber receiving space assumes a natural or circular curve 14b over a major portion within the sensor. In the deactivated position moveable sensor actuator 46 is maintained as shown in FIG. 4A by the magnetic force of attraction between magnet 56 and manhole cover 20 in its secured position. When the manhole cover is moved to the unsecured position, a predetermined distance from magnet 56, the magnetic attraction is broken and sensor actuator 46 moves vertically to place a predetermined bend 72 in the fiber 14a, as can best be seen in FIG. 4B. In order that a predetermined and characteristic bend is placed in the fiber that will emit a uniform signal anytime the sensor is activated, first arcuate abutment 58 includes a contour at 74. Preferably contour 74 is provided in the form of a tangential flat surface that creates a controlled radius in the bend 72 of the fiber that causes a characteristic, signature intrusion signal shape to be received by the OTR device and displayed, e.g., see signal 90a at FIG. 5. By providing a consistent and uniform fiber bend and attenuation, the intrusion signal can be detected and recognized on the display screen of the OTR device in a reliable manner.

In the preferred embodiment, actuator 46 includes magnet 56 which is maintained in the deactivated position by proximity of sensor 24 to the metal flange of manhole cover 20. Spring 50 is tensioned when moveable actuator 46 is in the deactivated position of FIG. 4A. When the magnetic force is broken, the spring tension pulls the actuator downwards to place predetermined bend 72 in optic fiber 14*a*. In the event that a nonmetallic material is used for the manhole manifold and cover, a metallic material insert may be placed in an area of the manhole cover which will maintain actuator 46 in a retracted, deactivated position of FIG. 4A. The manhole cover has a secure position fitted within the top opening of the manifold, and an unsecured position when it is moved from the secured position which is sufficient to break the magnetic attraction. In order to eliminate false detections, sensor 24 is mounted a sufficient distance from the manhole cover, e.g., one-half inch, so that fluttering of the cover by traffic, etc., does not break the magnetic attraction between actuator 46 and the cover. However, when the cover is moved a sufficient, predetermined distance to an unsecured position which indicates an intrusion, the magnetic attraction is broken and sensor actuator 46 moves to the activated position of FIG. 4B whereupon optic fiber 14*a* is deflected changing its reflection properties and attenuation. Variations on the sensor actuator and types of sensors, may be had, although it is advantageous that there be no mechanical or direct connection between the optic signal wire used in the sensor and the moveable closure member needed to be moved by an intruder, and that no electrical power be required for the sensor operation.

When a characteristic or signature intrusion signal is produced, such as 90*a*, 90*b*, or 90*c*, the OTR device measures the distance to the signal, or signals. The sensor locations are mapped by the processor system so that a display or printout of the sensor and its exact geographical location is produced. In this manner, the exact point of the intrusion is determined so that a timely response may be made at the location of the intrusion.

As can best be seen in FIG. 1, OTDR is connected to a computer system C having a computer processor 80 connected to a monitor 82 with a display screen 84. A normal OTDR signal 86 is transmitted from the OTDR to computer processor 80, and displayed on monitor 82. Conventional input devices, keyboard 88, and mouse 89, may be provided for operating computer system C. Of course, other means of displaying the OTDR signal may be used, such as a dedicated display device.

By providing a set of intrusion level and response data in computer readable form, and incorporation of software tools that match a reflected pulse signal deviation with one of the intrusion levels in the data set, a proper response to a change in a sensor line signal can be delivered. A suitable computerized system is disclosed in U.S. non-provisional application Ser. No. 11/083,038, filed Mar. 17, 2005, entitled "Apparatus And Method For A Computerized Fiber Optic Security System, commonly owned and incorporated by reference into this application. The system recognizes the different signals received from the OTDR on the basis of predetermined rules, and interprets the real event that caused the signal. For example, a "table look up" program may be used containing predetermined intrusion levels or types and their signature signals for comparison to reflected pulse signals. The system also allows the use of multiple sensors to be recognized simultaneously by the system and unique baselines to be identified by sensor type, location, etc. The system can discern the difference between authorized and unauthorized activity. By using the look-up table which is distinctly different from prior technology that simply recognizes attenuation due to micro bending. The programmed processor catalogs predetermined events on the basis of the reflected signals and recognize them as either authorized or not authorized when (and where) they occur.

The fiber optic monitoring system maintains the ability to recognize specific signals on a common fiber and segregate those that are authorized from the signals that denote unauthorized activity. As illustrated, the system may function with both contact and non contact sensors. For example, non-contact sensors are used for the sensing of the presence of manhole covers. For maintenance reasons these sensors don't physically touch the lid. They measure the proximity of the lid to the sensor. Thus, the sensor detects intrusion without physical contact. The software instructions can uniquely detect intrusion with both contact and non-contact sensors simultaneously. In either case, the intrusion detection is accomplished by interrogating the light reflected out of the fiber when a sensor is triggered. The system provides for multiple sensors to be "tripped" at the same time and the invention will track the status of each independently, as illustrated in FIG. 8. Here, two sensors are being tracked as "tripped" and a cut in the connecting cable is detected.

Referring to FIGS. 5 through 8, the operation of the system and identification of activated sensors will now be discussed. FIG. 5 illustrates display screen 84 of monitor 82 displaying a normal signal 86 which is received in the absence of a signature intrusion event, or other fiber disturbance signal. Optic sensor fiber 14*a* is commonly routed through each of sensors 24*a*, 24*b*, 24*c*. As illustrated in FIG. 5, none of the sensors are activated so a normal signal 86 is displayed on the screen. In FIG. 6, sensor 24*b* is activated, and an OTDR intrusion signal 90*b* is displayed showing that an intrusion event has occurred at sensor 24*b*. Since the location of sensor 24*b* is known and mapped, the location of the intrusion is determinable. FIG. 7 shows the graphic display screen 60 when an instruction event has occurred at both sensor 24*b* and 24*c*, as indicated at signal 90*b* and 90*c*. FIG. 8 illustrates graphic display of OTDR signals at 90*a*, 90*b*, and 90*c* when an intrusion event has occurred at all three sensors 24*a*, 24*b*, and 24*c*. Since the locations of sensors 24*a*, 24*b*, 24*c* are predetermined and mapped, the location of the intrusion event is known by knowing which sensor is activated. It is noted that signature intrusion signals 90*a*, 90*b*, and 90*c* have a characteristic shape predetermined by the shape of bend 72 created in optic sensor fiber 14*a* by contour 74 of abutment 58. This characteristic signal shape is reliably recognized as an intrusion event signal. Typically, the OTDR will also have other characteristic signals which represent other fiber disturbances and resulting attenuation. For example, a 0.5 db power drop indicates an intrusion, a 1 db power drop indicates water seepage, a 0.3 db power drop indicates an irregular bend, a fiber breakage is represented by a straight spike, etc.

Referring now to FIGS. 9A through 12, another advantageous embodiment for a fiber optic sensor will be described. This embodiment is particularly advantageous since an adequate pulse width is produced for detection even if the removable member, e.g., manhole cover, is replaced quickly or instantly. For example, this could happen in the event someone removes the cover, sees the sensor and then closes it quickly. In this situation, it is desirable to sense that such a quick intrusion has been made. However, if sensor fiber 14*a* is deflected and restored too quickly, the signal produced may only be a blip that is insufficient to be detected by the OTDR.

Figure 9A:
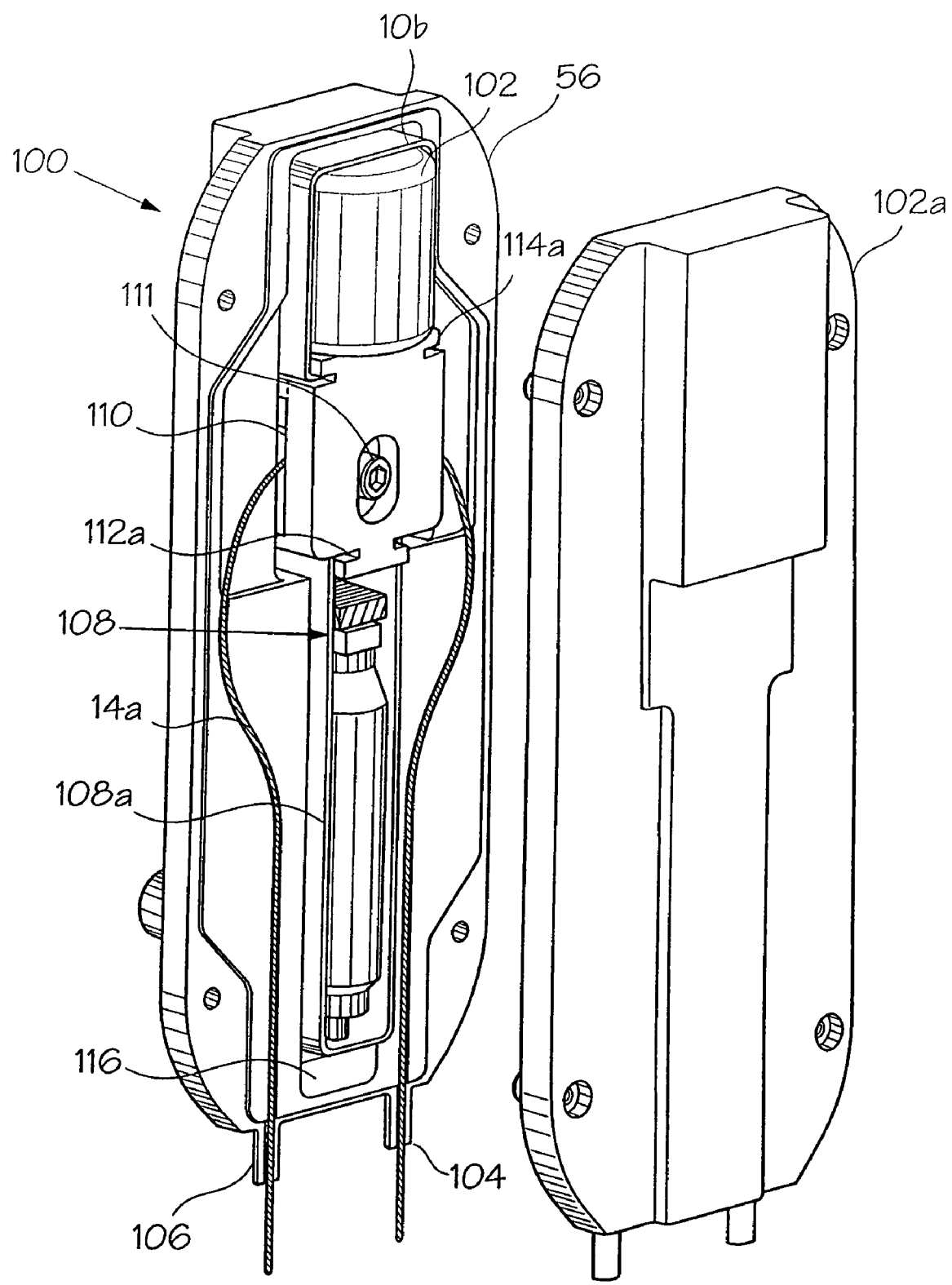
FIG. 9A is a perspective view of another embodiment of a sensor according to the invention which produces a signal having at least a prescribed minimum value.
Figures 10, 11:
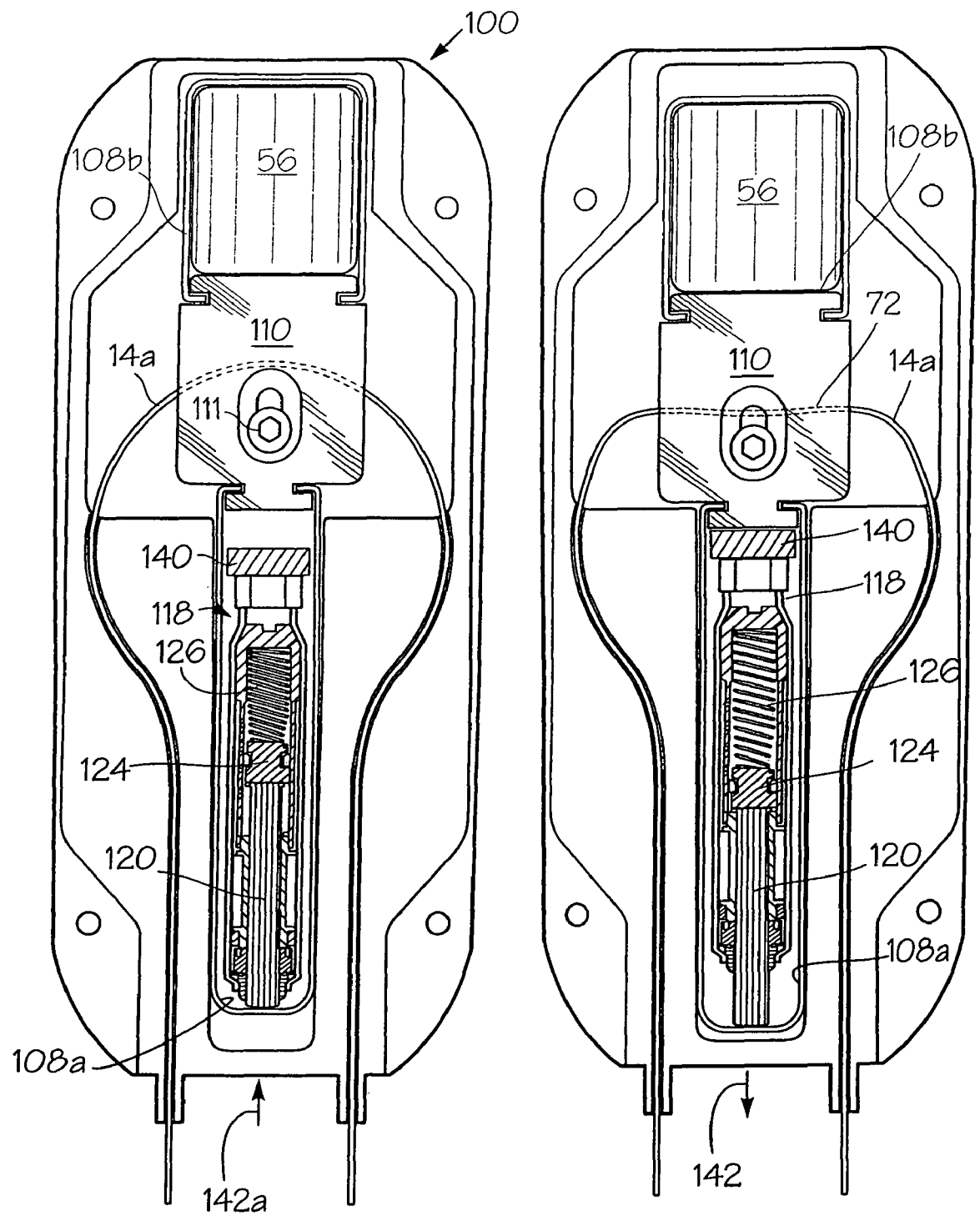
FIGS. 10 and 11 are front elevations in section of the sensor of FIG. 9A illustrating a signal control and shaping device for producing a minimum signal.

As can best be seen in FIG. 9A, a fiber optic sensor designated generally as 100, is illustrated and includes a housing 102 having a fiber entrance 104 and a fiber exit 106. A moveable carrier, designated generally as 108, is illustrated which includes a lower strap 108*a,* an upper strap 108*b,* secured together by means of a sensor block 110. Sensor block 110 includes lower abutment 110*a* and upper abutment 110*b* which produce the natural and characteristic bends in the sensor fiber. Abutment 110*a* is adjustable by means of a set screw 111 so as to vary throat 110*c* through which fiber 14*a* passes to adjust the bends produced by the sensor block. Lower strap 108*a* includes a pair of inward flanges 112 secured in corresponding slots 112*a* of sensor block 110. Likewise, upper strap 108*b* includes a pair of inwardly turned flanges 114 secured in corresponding slots 114*a* in the upper part of sensor block 110. The slidable carrier 108 moves between a normal deactivated position shown in FIG. 10 in which the carrier is raised by magnetic attraction between magnet 56 and the removable member to its upper most position. In FIG. 11, the carrier is shown in its downward activated position caused by interruption of the magnetic attraction between magnet 56 and the removable member. A cavity 116 in which the slidable carrier 108 moves is formed within sensor housing 102. A back shell 102*a* to the housing 102 is fastened to complete the housing and secure the internal parts just described.

In order that a quick opening and closing of the removable member results in a discernable signal that can be detected by the processor, e.g. OTDR 12, a signal control device is provided to shape the signal so that any signal generated by the sensor has a prescribed minimum pulse duration (width), regardless how quickly the manhole cover is removed and replaced. In the illustrated embodiment this is accomplished by a delay mechanism, designated generally as D, in the form of a fluid cylinder 118 that delays the movement of carrier 108 to the deactivated (uppermost) position following movement to the activated (downward} position. Thus, the deflection of the fiber optic 14*a* back to its natural state is delayed. In the illustrated embodiment, means for delaying return of the fiber optic to its natural shape so that a pulse width of sufficient duration for sampling is generated under the control or shaping provided by delay hydraulic cylinder 118. This can best be seen in FIG. 13 wherein signal 140 is generated that is not recognizable by the processor because of its insufficient pulse width $t_0$. Instead, in this situation, the signal shaping device produces a signal 142 having a prescribed minimum pulse width $t_{min}$ that has been determined to be reliably recognizable by the processor. For example, a minimum pulse width of 15 seconds is necessary for recognition and sampling by a typical OTDR. To ensure reliable detection, the control device is preferably set to produce a minimum pulse duration of 45 seconds. Thus, even if the intruder drops the cover quickly, for example after seeing the sensor, a recognizable signal is transmitted to the processor.

Figure 9B:
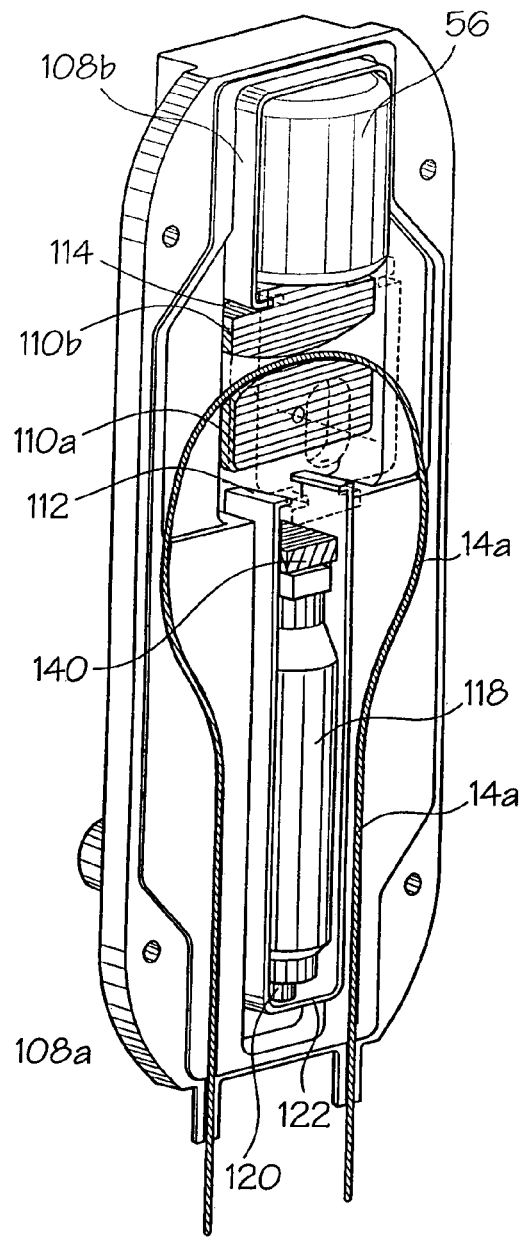
FIGS. 9B and 9C are perspective views illustrating the sensor of FIG. 9A in deactivated and activated positions.
Figure 9C:
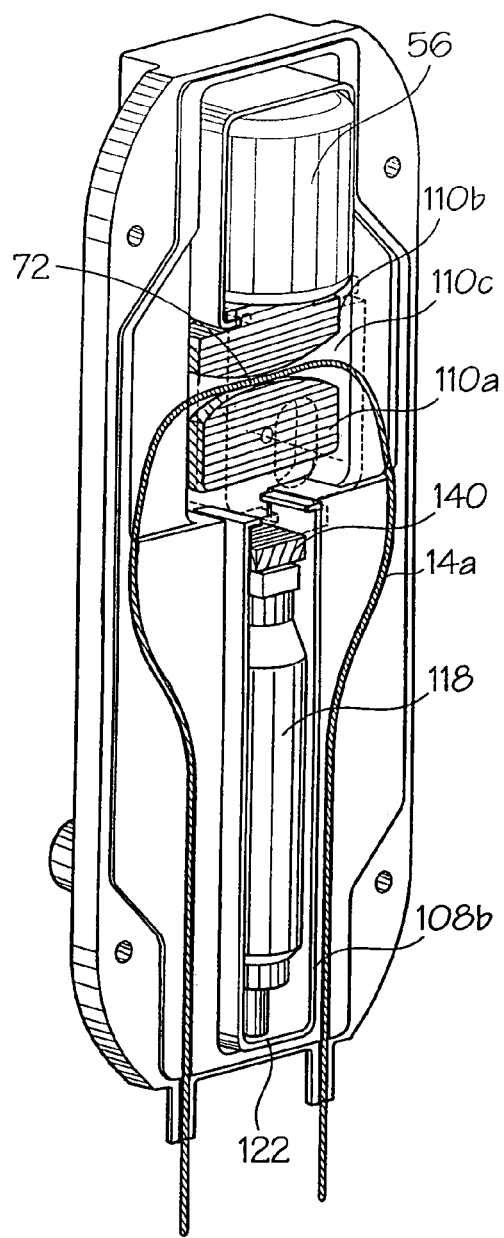

Referring now to FIGS. 9A through 9C, a reciprocating piston rod 120 extending from the cylinder bears against a bottom strap 122 of lower carrier strap 108*b.*

Figures 12, 13:
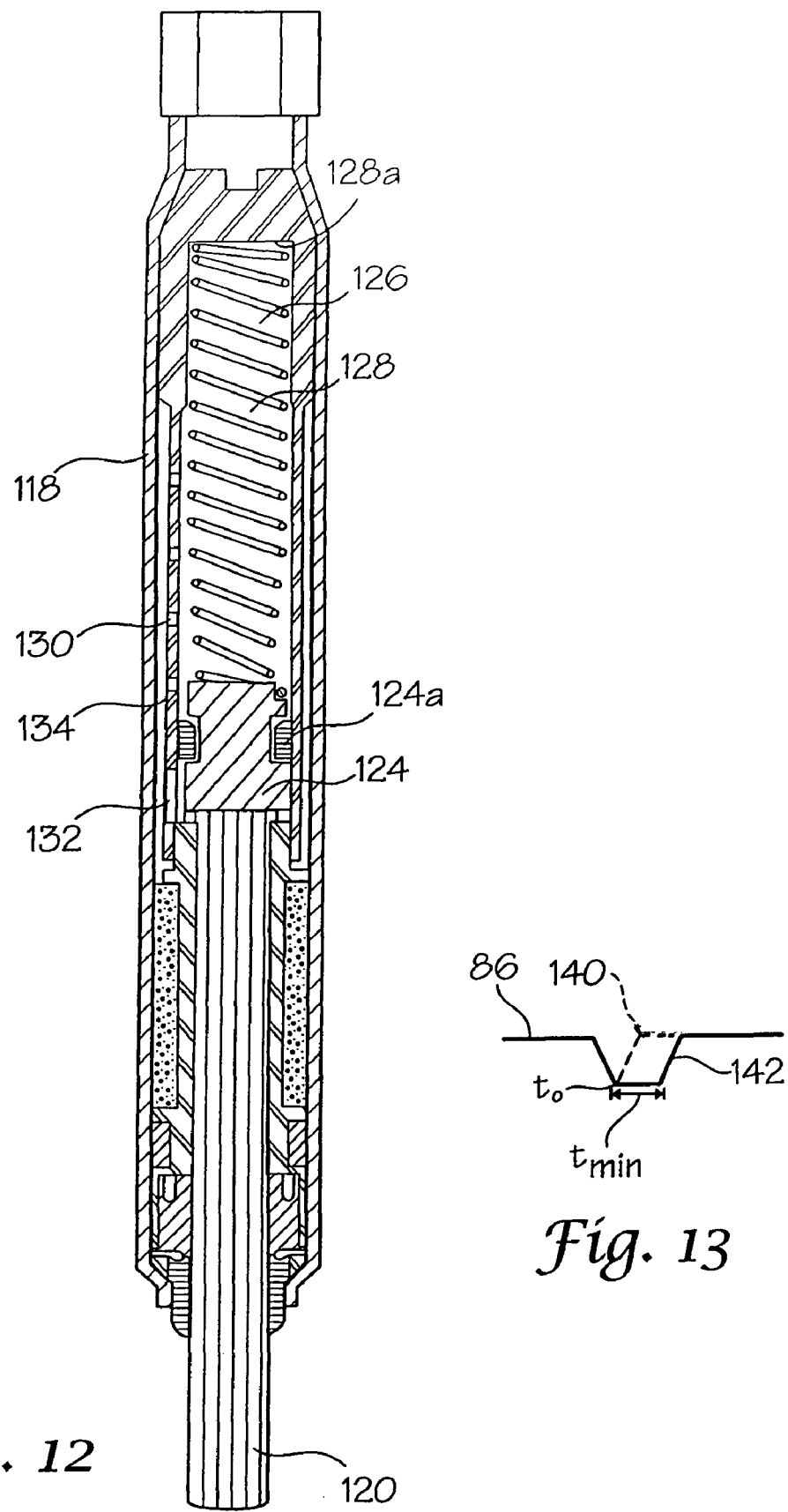
FIG. 12 is a sectional view of a delay mechanism for a signal control device which delays deactivation of the sensor to provide a prescribed minimum pulse width for reliable detection.
FIG. 13 is a schematic illustration of an insufficient sensor signal converted to a minimum width signal.

As can best be seen in FIGS. 10 through 12, delay cylinder 118 includes a piston head 124 at the end of piston rod 120 having a check ring 124*a.* A compression spring 126 is carried between piston head 124 and an upper end 128*a* of a fluid chamber 128 in which oil, or other hydraulic fluid or gas, is enclosed. Fluid chamber 128 includes a plurality of minor orifices 130 and a major orifice at 132. Passageway 134 connects the fluid chamber 128 above and below check ring 124*a* by means of the minor and major orifices. As can best be seen in FIGS. 9B and 9C, delay cylinder 118 is positioned between an abutment 140 affixed in the cavity 116 of housing 102 and bottom strap 122, as can be seen in FIGS. 10-11 to act as a shock absorber to delay the return of carrier 108 to its deactivated position. A suitable cylinder is manufactured by Enidine Incorporated of Orchard Park, N.Y. The shape of cavity 116 is contoured to accommodate the shape of sliding carrier 108.

In operation, in the normal position of sensor 100 (FIG. 10), slidable carrier 108 is in its up position which urges piston 120 upwards into cylinder compressing spring 118. When the magnetic attraction is broken by sufficient movement of the manhole cover, piston head 124 moves downward in the direction of arrow 142 quickly as the spring decompresses. In this situation, fluid either bypasses check ring 124*a,* or exits major port 132 so that sensor fiber 14*a* is deflected quickly to form its characteristic bend 72 producing a signal. In order that the pulse width of the signal is sufficient to detect, even if the cover is placed back quickly, the ascent of the carrier in the direction of arrow 142*a* is retarded. This is caused by the fact that in order to reach its normal shape (FIG. 10) in the normal position of magnet 56, fluid pressure must be overcome, as well as the compression of spring 126. Thus, as carrier 108 moves upward causing piston rod 120 to move upward, piston head 124 is caused to force fluid out through the restricted, minor orifices 130 into passage 134, as well as to compress spring 126. This delays the termination of the signal sufficiently so a pulse width is provided that can be detected by the OTDR. This is particularly advantageous if a large number of sensors are utilized along a fiber network having a long distance so that activation of a plurality of sensors can be detected generally concurrently even if the closure member is quickly replaced.

Figure 14A:
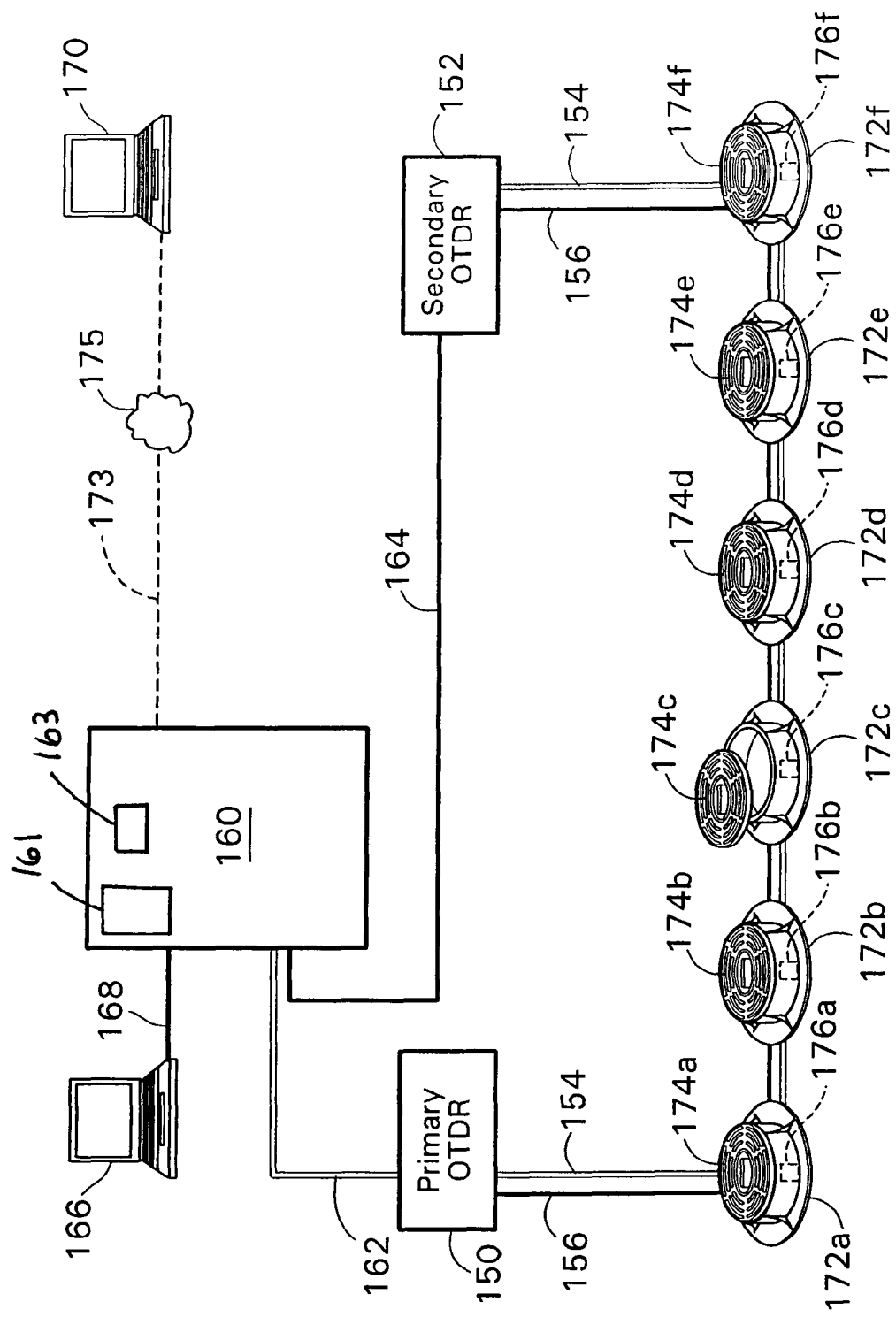
FIG. 14A is a schematic illustration of another embodiment of the invention wherein a double-end OTDR system is provide to ensure reliability in the event a optical fiber sensor line is severed.
Figure 15B:
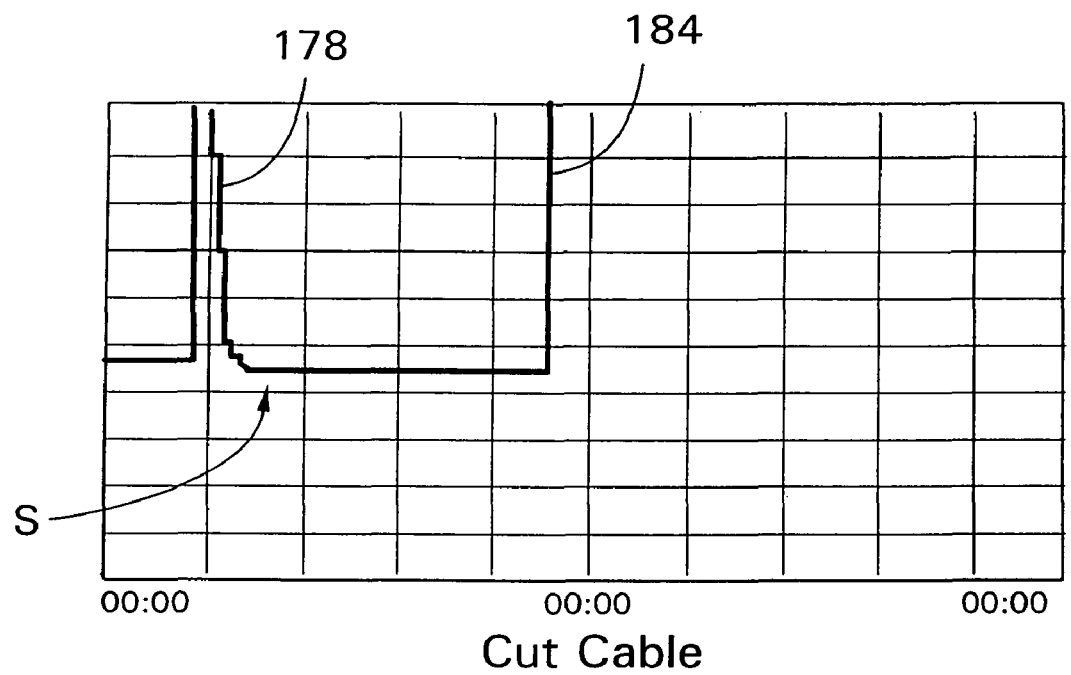
FIG. 15B is a graphic display of an OTDR signal when a an optical fiber sensor line is severed in the system of FIG. 15A.
Figure 15A:
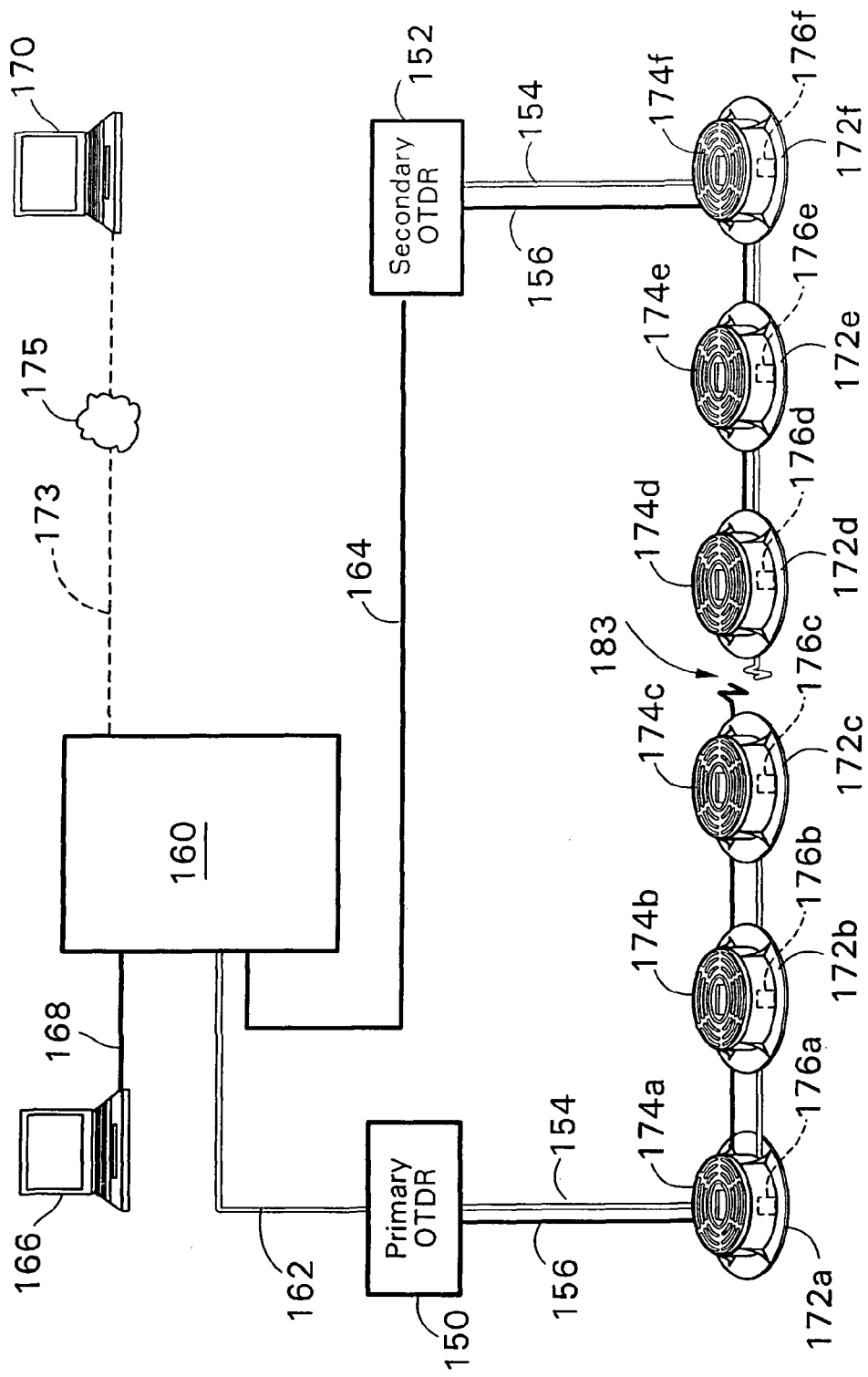
FIG. 15A is a schematic illustration of the double-end OTDR system when an optical fiber sensor line is severed.
Figure 16A:
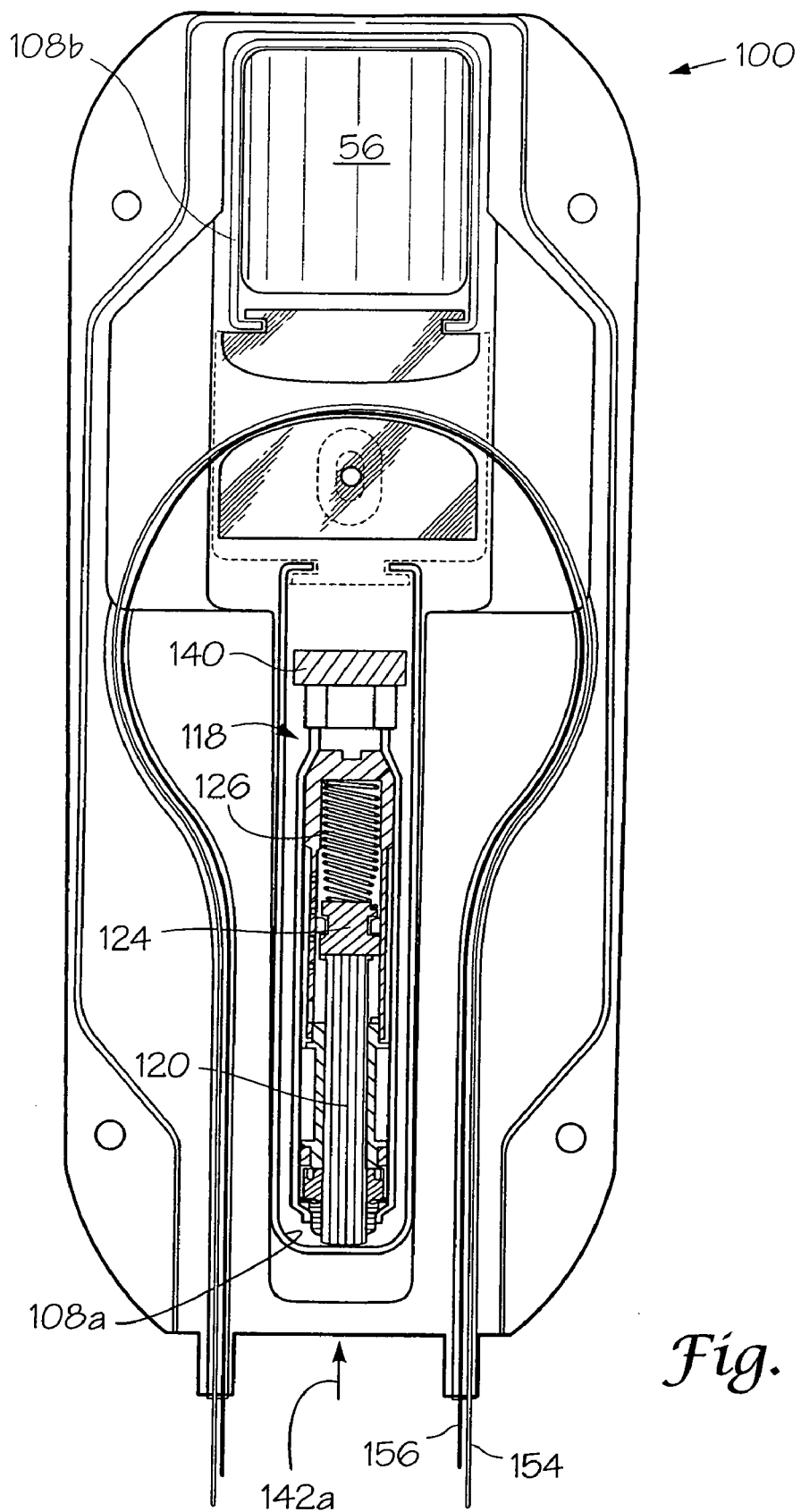
FIG. 16A is a front elevation illustrating a optic fiber intrusion sensor and primary and secondary optic fiber sensor lines routed through the sensor with the sensor in a deactivated position.
Figure 16B:
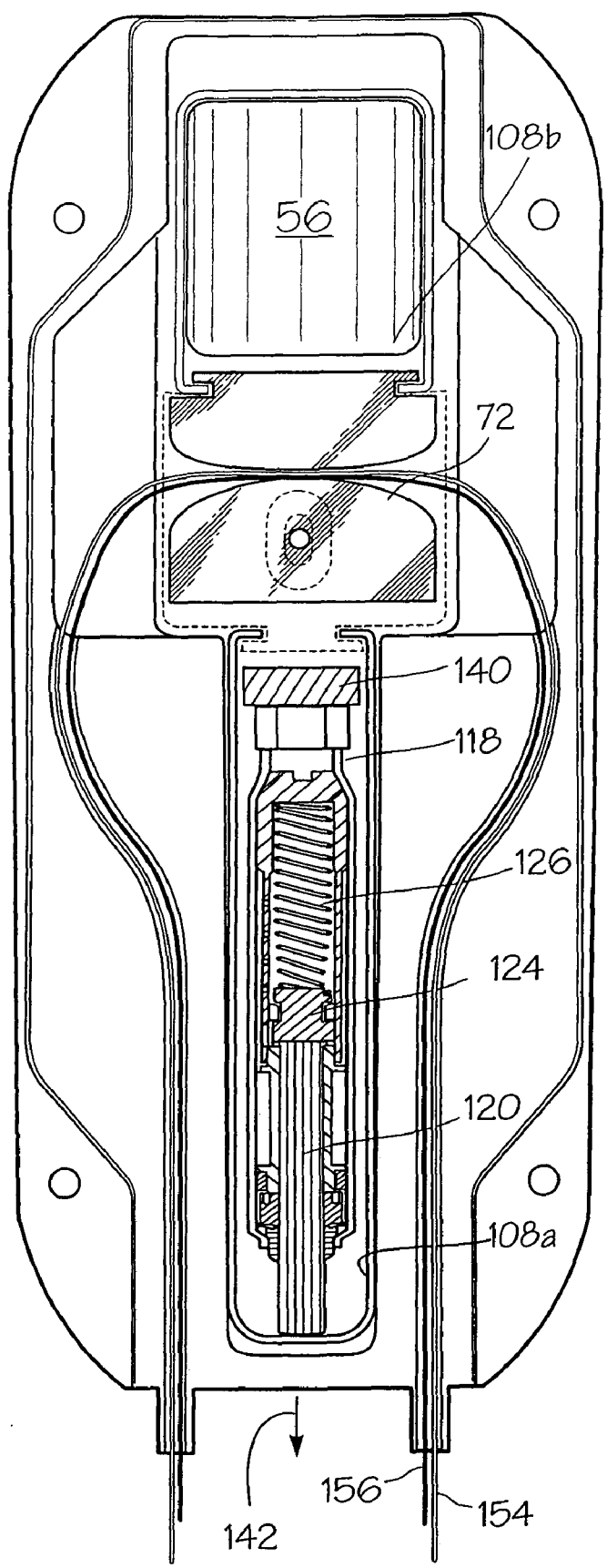
FIG. 16B is a front elevation illustrating a optic fiber intrusion sensor and primary and secondary optic fiber sensor lines routed through the sensor with the sensor in an activated position.

As can best be seen in FIGS. 14-16 another embodiment of the invention, designated as A', is illustrated wherein a double-end optical fiber sensor line arrangement is employed for detecting intrusions and ensuring that a complete break in the fiber will not render the system inoperative. As illustrated, the system includes a pair of sensor line scanning units in the form of a primary OTDR 150 and a secondary OTDR 152 optically connected to first and second optical fiber sensor lines 154 and 156, respectively. Sensor line 154 is operatively terminated at one end to the OTDR 150 and is connected in a non-terminated manner at OTDR 152. Likewise, sensor line 156 is operatively terminated at OTDR 152 and is connected in a non-terminated manner to OTDR 150. Other scanning arrangements and means may be provided such as a single unit combining the pulsing and scanning functions of two units. Both sensor lines are routed through the sensors associated with each manhole and may be enclosed by an outer cable wrap. Primary OTDR 150 and sensor line 154 are connected to a system server/computer or processor 160 by means of a cable 162, and secondary OTDR 152 and sensor line 156 are connected to the computer by a cable 164. A computer monitor 166 is connected to the server by means of a cable 168. Optionally, a remote computer 170 may be connected to the server by means of the internet or other network. In the illustrated embodiment, a plurality of openings which would ordinarily permit intrusion to a secured area are illustrated by a plurality of manholes 172*a* through 172*f* having manhole covers 174*a* through 174*f.*

Primary sensor line 154 may be considered the primary line and normally senses movement of a manhole cover in an intrusion attempt. However, should the sensor line be cut and a complete break of the line occur, the sensor line 156 will continue to sense movement of covers on a first, upstream side of the break, and sensor line 154 will continue to sense movement of covers on a second downstream side of the break.

Figure 14B:
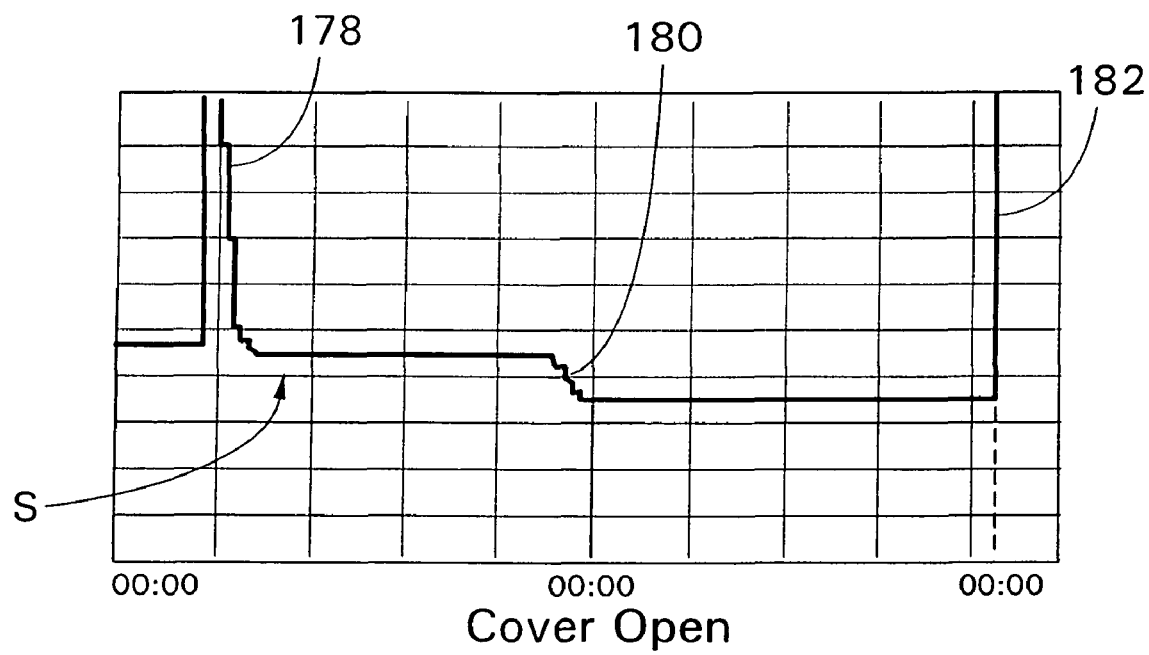
FIG. 14B is a graphic display of an OTDR signal when a cover is removed from a manhole and the like in the system of FIG. 14A.

In operation, the primary OTDR emits a light pulse signal every 10 seconds, for example, and this pulse travels down the optical fiber sensor line 154. The light travels to the end of sensor line 154 at the secondary OTDR and reflects back to the primary OTDR. As long as the reflections and attenuations match the reflection signal created when the system was installed, the OTDR waits till the appointed time and repeats the process. Should the emitted light encounter an obstacle, a reflection is "bounced" back to the OTDR that does not match the reflection seen when the system was installed. Should light be lost (attenuated) from the fiber, this reflection occurs at a lower energy level, than was originally transmitted. This combination of reflections and attenuations defines a picture of the fiber sensor line, and this picture is called a signature. As long as the signature matches that of the original configuration of the system, the software records the data and takes no action. Illustrated in FIG. 14B is an OTDR trace showing attenuation in the light energy at a location that corresponds to the location of a manhole 174c being monitored by the system. Manhole 174c was closed when the system was installed, now it is opened. We know that because the attenuation "dip" on the graph at 180 is the signature of an open manhole lid.

A vertical spike in the graph at 182 is a reflection that indicates the end of the fiber. All light is reflected from the cleaved face of the fiber, thus the high reflective spike. The secondary OTDR fiber 156 is shown as black in the image to signify that the fiber is dark and not normally in use. Normally, secondary OTDR 152 and sensor line 156 are only used when there is a complete break in the sensor lines, as explained below. Preferably, the primary OTDR and the secondary OTDR are cycled by the processor every 24 hours so that the secondary OTDR and sensor line are dark for 24 hours and then the primary OTDR and sensor line are dark for 24 hours to ensure that both units remain in operational. Of course, while one unit is dark the other is operational with light pulse signals. While both units could be operated at the same time, it would serve no purpose.

As can best be seen in FIGS. 15A and 15B manholes 172c and 172d, the fiber connecting several manhole sensors has been cut at 183 between the third and fourth manholes. This is known because spike 182 has "moved" on the graph from right to left at 184. When the software sees this signature of a break (a reflective spike) several things happen. Among these triggered events is the firing of the secondary OTDR 152 to pulse secondary sensor line 156. The secondary OTDR monitors secondary sensor line 156 housed in the same cable as primary sensor line 154 of the primary OTDR. This secondary sensor line also passes through each sensor in the circuit. Now, the secondary OTDR can monitor the manhole sensors downstream from the break and the primary OTDR monitors those manholes upstream from the break. This "double end" arrangement ensures that a break or severance in the fiber will not render the system inoperative. In similar fashion, the secondary OTDR will be fired if the primary OTDR fails and the system will remain operable. The signature intrusion signals are stored in the intrusion level data set for comparison to the periodic reflected pulse signals.

System computer/processor 160 includes a resident computer program (software) 161 having features to process the detection and assessment of a pulse reflection and intrusion signal to determine the cause of the signal and select a response to the threat automatically. For example, in the case of the signature signal for an open manhole cover shown in FIG. 14b the software can trigger a camera to see the specific reason that the manhole is being opened. This image will be captured and transmitted over the network to interested parties as a customer configured response to the assessment. In the second signature signal shown in FIG. 15b the cutting of an optical sensor line signifies a high priority threat at the location. In this case, the software may advise a response team of the status and location of the cut. This response can include initiating a "lock down" of all perimeter gates in response to the signature, and alerting off-site response teams as back-ups. Any number of signature signals and responses may be programmed depending on the application being made. Assessment of the intrusion and initiating responses is a unique aspect of the present invention. The signature signals can be provided by a set 163 of signature intrusion level data in computer readable form and, for example, in a table lookup form. The data is stored in a computer memory accessible by the processor, and may also include response data used to signal a predetermined response to the proper personnel, a desired by the customer/user. The data is compiled by performing bending or damage to the fiber lines that would occur under prescribed intrusion attempts desired to be monitored and capturing the signature of the reflected pulse signal. The software tools match a reflected pulse signal deviation with one of the signature intrusion levels signals in the data set, a proper response to a change in a sensor line signal can be delivered. A suitable computerized system and program is disclosed in U.S. non-provisional application Ser. No. 11/083,038, filed Mar. 17, 2005, entitled "Apparatus And Method For A Computerized Fiber Optic Security System," now published as International Publication Number WO 2006/05277 A2, on May 18, 2006, commonly owned and incorporated by reference into this application. The system recognizes the different signature signals received from the OTDR on the basis of predetermined rules, and interprets the real event that caused the signal. The system also allows the use of multiple sensors to be recognized simultaneously by the system and unique baselines to be identified by sensor type, location, etc. The system can discern the difference between authorized and unauthorized activity. The programmed processor has the ability to catalog predetermined events on the basis of the reflected signals and recognize them as either authorized or not authorized when (and where) they occur.

Thus, it can be seen that a highly advantageous construction for a security system and sensor can be had according to the invention where preexisting or new fiber networks can be utilized to provide optical fiber sensor lines routed through sensors connected in series and terminated with an OTDR device to determine the occurrence and location of an intrusion anywhere along the fiber optic lines. In this manner, the entire network of manholes and fiber optic network, as well as other underground utilities, may be secured against terrorists or other acts of invasion, vandalism, etc. The fiber optic monitoring system maintains the ability to recognize specific signals on a common fiber and segregate those that are authorized from the signals that denote unauthorized activity. Currently, the invention can recognize nine different signals on the fiber. These signals may occur on the same fiber, or separate fibers. As illustrated, the system may function with both contact and non-contact sensors. For example, non-contact sensors are used for the sensing of the presence of manhole covers. For maintenance reasons these sensors do not physically tough the lid. They measure the proximity of the lid to the sensor. Thus, the sensor detects intrusion without physical contact. The software instructions can uniquely detect intrusion with both contact and non-contact sensors simultaneously. In either case, the intrusion detection is accomplished by interrogating the light reflected out of the fiber when a sensor is triggered. The system provides for multiple sensors to be "tripped" at the same time and the invention will track the status of each independently, as illustrated in FIG. 8.

Here, two sensors are being tracked as "tripped" and a cut in the connecting cable is detected.

While a preferred embodiment of the invention has been described using specific terms, such description is for illustrative purposes only, and it is to be understood that changes and variations may be made without departing from the spirit or scope of the following claims.

What is claimed is:

1. A security system for detecting unauthorized intrusions at a plurality of predetermined locations having moveable closure members which must be moved in order to gain entry into said locations, said system comprising:
    a plurality of intrusion sensors disposed at said locations for detecting movement of said closure members and attempted intrusions at said locations and generating intrusion signals when one or more intrusion sensors are activated by a prescribed level of intrusion activity;
    a primary optical fiber sensor line routed through said intrusion sensors being operable to monitor downstream sensors downstream of a break in said primary sensor line;
    a secondary optical fiber sensor line routed through said intrusion sensors being operable to monitor upstream sensors upstream of said break in said secondary sensor line;
    a primary scanning unit in communication with said primary sensor line for generating and transmitting light pulse signals along said primary sensor line, and receiving reflected pulse signals reflected back along said primary sensor line;
    a secondary scanning unit in communication with said secondary sensor line for generating and transmitting light pulse signals along said secondary sensor line, and receiving reflected pulse signals reflected back along said secondary sensor line;
    a processor in communication with said primary and secondary scanning units for processing said reflected pulse signals to determine if a change has occurred in a reflected pulse signal signifying a prescribed level of unauthorized intrusion activity and an intrusion signal; and
    said processor generating an alarm signal in response to determining said intrusion signal for signaling a predetermined response to the activity and an indication of the specific location of the unauthorized activity.

2. The system of claim 1 wherein said processor activates said secondary scanning unit in the event a break occurs in at least one of said primary and secondary sensor lines so that said secondary scanning unit monitors intrusion sensors upstream from the break and the primary scanning unit monitors intrusion sensors downstream from the break.

3. The system of claim 2 wherein said secondary scanning unit remains deactivated until said break occurs in said sensor lines.

4. The system of claim 1 wherein said processor controls the scanning units to pulse the first sensor line for a predetermined period of time with the second sensor line deactivated, and then pulse the second sensor line for a predetermined period of time with the first sensor line deactivated wherein the activation/deactivation cycles of the sensor lines are continually repeated in the absence of a break in the lines.

5. The system of claim 1 wherein said intrusion sensors are disposed adjacent said moveable closure members in a non-contacting manner, and said sensors detect a predetermined movement of said moveable closure members from a secured position to an unsecured position whereby intrusion signals are sensed without physical contact between said sensors and said closure members.

6. The system of claim 5 wherein said intrusion sensors include magnetic attractions between said sensors and said moveable closure members whose interruption causes activation of said sensors and generation of said intrusion signals.

7. The system of claim 5 including a signal control device associated with said sensor for producing an intrusion signal of a predetermined minimum duration regardless of how quickly said moveable closure member is returned to said secured position, said minimum duration being sufficient so that said intrusion signal is reliably recognized by said processor.

8. The system of claim 1 wherein said sensors include a moveable sensor actuator having a deactivated position and an activated position, said sensor actuator engaging said fiber sensor line when said closure members are in an unsecured position causing sensor activation and said intrusion signal to be generated.

9. The system of claim 8 wherein said moveable sensor actuator forms a characteristic bend in said optical sensor fibers when activated to produce a signature intrusion signal readily recognizable by said processor as signifying said prescribed level of unauthorized activity.

10. The system of claim 8 wherein said sensor includes a sensor housing having a fiber chamber, and a fiber inlet and a fiber outlet; and said primary and secondary sensor fibers being routed through said fiber inlet, said fiber chamber where said sensor fiber assumes said natural bend, and said fiber outlet.

11. The system of claim 1 including a signal control device associated with said sensor for producing an intrusion signal of a predetermined minimum duration regardless of how quickly said moveable closure member is returned to said secured position, said minimum duration being sufficient so that said intrusion signal is reliably recognized by said processor.

12. The system of claim 11 wherein said control device includes a delay mechanism for delaying the return of said actuator to said deactivated position from said activated position.

13. The system of claim 1 includes a set of intrusion type data corresponding to levels of unauthorized activity stored in a computer readable medium accessible by the processor so that said processor compares said intrusion signal to said data to identify the type of intrusion when the intrusion signal matches the data.

14. The system of claim 1 including a set of signature intrusion type data stored in a computer readable medium accessible by the processor corresponding to different levels of unauthorized activity; and said processor processing said intrusion signal to identify the type of intrusion based on a match between the intrusion signal and the signature intrusion signals and generating a corresponding alarm response when the signals match.

15. A security system for detecting an intrusion at one or more predetermined locations wherein each location includes a moveable closure member which must be moved in order to gain entry into said location, said system comprising:
    intrusion sensors disposed at each of said one or more locations for detecting a predetermined movement of said moveable closure member to an unsecured position at said location;

a primary optical fiber sensor line routed through said intrusion sensors being operable to monitor downstream sensors downstream of a break in said primary sensor line;

a secondary optical fiber sensor line routed through said intrusion sensors being operable to monitor upstream sensors upstream of a break in said secondary sensor line;

scanning means in communication with said sensor lines for transmitting periodic pulse signals along said sensor lines, and receiving reflected pulse signals reflected back from an end of said sensor lines; and said processor controlling said scanning means in the event a break occurs in said sensor lines so that said secondary sensor line is operable to pulse intrusion sensors upstream from the break and said primary sensor line is operable to pulse intrusion sensors downstream from the break.

16. The system of claim 15 including an alarm signal output by said processor in response to said intrusion signal including an identification of the specific location and type of the attempted intrusion.

17. The system of claim 15 includes a set of intrusion type data corresponding to levels of unauthorized activity stored in a computer readable medium accessible by the processor so that said processor compares said intrusion signal to said data to identify the type of intrusion when the intrusion signal matches the data.

18. The system of claim 15 wherein said sensors include moveable sensor actuators having deactivated positions and activated positions, said sensor actuator engaging said sensor line when said sensors are activated to create a deformation of said sensor lines and said change in reflected pulse signals.

19. The system of claim 18 wherein said sensors include magnetic attractions between said sensor actuators and said moveable closure members whose interruption causes activation of said sensors and deformation of fiber sensor lines.

20. The system of claim 15 wherein said sensors includes a sensor housing having a fiber chamber with a fiber inlet and outlet, and said optic sensor lines fiber being routed through said fiber inlet, chamber, and outlet at said locations.

21. The system of claim 15 including a signal control device associated with said sensor for producing an intrusion signal of a predetermined minimum duration regardless of how quickly said moveable closure member is returned to said secured position, said minimum duration being sufficient so that said intrusion signal is reliably recognized by said processor.

22. The system of claim 15 including a set of signature intrusion type data stored in a computer readable medium accessible by the processor corresponding to different levels of unauthorized activity; and said processor processing said intrusion signal to identify the type of intrusion based on a match between the intrusion signal and the signature intrusion signals and generating a corresponding alarm response when the signals match.

23. The system of claim 15 wherein said processor controls the scanning units to pulse the first sensor line for a predetermined period of time with the second sensor line deactivated, and then pulse the second sensor line for a predetermined period of time with the first sensor line deactivated wherein the activation/deactivation cycles of the sensor lines are continually repeated in the absence of a break in the lines.

24. A method for detecting intrusion into a protected location comprising:

providing at least one intrusion sensor for detecting a predetermined movement of a moveable closure member which must be moved in order to gain entry into said location;

routing first and second fiber optic sensor lines through said intrusion sensor;

using a first optical scanning unit to pulse said first fiber optic sensor line with a periodic pulse signal and receiving a reflected pulse signal back from said sensor line;

using a second optical scanning unit to pulse said second fiber optic sensor line with a periodic pulse signal and receiving a reflected pulse signal back from said sensor line; and processing said reflected pulse signals to determine if a predetermined reflection and/or attenuation change in said pulse signals has occurred signifying a predetermined level of unauthorized activity and an intrusion signal and identify the type and location of the intrusion.

25. The method of claim 24 including providing a sensor having a moveable actuator which contacts said fiber causing said change in said pulse signal in response to movement of said moveable closure member to said unsecured position.

26. The method of claim 24 including providing communication between said sensor and moveable closure member without making mechanical contact there between.

27. The method of claim 24 including shaping said intrusion signal to have at least a prescribed minimum pulse width no matter how quickly said actuator return to a deactivated position from said activated position so that a sufficient intrusion signal is generated for reliable detection by the processor.

28. The method of claim 24 including pulsing the first sensor line for a predetermined period of time with the second sensor line deactivated, and then pulsing the second sensor line for a predetermined period of time with the first sensor line deactivated, and repeating the activation/deactivation cycles of the sensor lines in the absence of a break in the lines.

29. The method of claim 24 including providing a set of intrusion type data corresponding to levels of unauthorized activity stored in a computer readable medium accessible by the processor, and processing said intrusion signal along with said type data to identify the type of intrusion when the intrusion signal matches the data.

* * * * *